United States Patent
Matsumoto et al.

(10) Patent No.: US 7,564,769 B2
(45) Date of Patent: *Jul. 21, 2009

(54) PHASE-CHANGE RECORDING MEDIUM HAVING THE RELATION BETWEEN PULSE PATTERNS AND REFLECTIVITY OF UN-RECORDED SECTION

(75) Inventors: Ikuo Matsumoto, Mito (JP); Hiroshi Tabata, Mito (JP); Kenji Tokui, Hitachinaka (JP); Kazuo Yonehara, Hitachinaka (JP); Kenichi Shimomai, Mito (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 1018 days.

This patent is subject to a terminal disclaimer.

(21) Appl. No.: 11/044,545

(22) Filed: Jan. 26, 2005

(65) Prior Publication Data
US 2005/0232129 A1    Oct. 20, 2005

(30) Foreign Application Priority Data
Jan. 30, 2004    (JP)    ............ 2004-023432

(51) Int. Cl.
*G11B 7/24*    (2006.01)
(52) U.S. Cl. ............ 369/275.1; 369/275.2; 430/270.13
(58) Field of Classification Search ... 369/275.1–275.5, 369/116, 47.5–45.53; 428/64.1; 430/270.13
See application file for complete search history.

(56) References Cited
U.S. PATENT DOCUMENTS
7,063,875 B2* 6/2006 Deguchi et al. ............ 428/64.1

7,376,065 B2* 5/2008 Tabata et al. ............ 369/59.11
(Continued)

FOREIGN PATENT DOCUMENTS
JP    06-004900    1/1994
(Continued)

OTHER PUBLICATIONS
Japanese Office Action (w/English Translation) (Dec. 25, 2008—4 pages).

*Primary Examiner*—Tan X Dinh
(74) *Attorney, Agent, or Firm*—Renner, Kenner, Greive, Bobak, Taylor & Weber

(57) ABSTRACT

A phase-change optical storage medium has a substrate, and a recording layer, to be recorded on which is at least one recorded mark representing information to be recorded by irradiating a recording light beam onto the recording layer in accordance with a recording pulse pattern of recording pulses rising from an erasing power and formed between a recording power larger than the erasing power and a bottom power smaller than the erasing power and of erasing pulses rising from the bottom power to the erasing power. The expressions (1) and (2): $1.00<(R1/R0)<1.15$ ... (1), $1.05<(R9/R0)<1.20$ ... (2) are satisfied for the recording layer, in which $R0$ is a reflectivity exhibited by an un-recorded section of the recording layer, on which no data has ever been recorded, when irradiated with a reproducing light beam, $R1$ is a reflectivity exhibited by the un-recorded section when irradiated with the reproducing light beam, after irradiated once with the recording light beam in accordance with the recording pulse pattern, and $R9$ is a reflectivity exhibited by the un-recorded section when irradiated with the reproducing light beam, after irradiated nine times with the recording light beam in accordance with the recording pulse pattern.

3 Claims, 14 Drawing Sheets

U.S. PATENT DOCUMENTS

| | | | |
|---|---|---|---|
| 7,452,582 B1 * | 11/2008 | Nobukuni et al. | 428/64.1 |
| 2004/0248036 A1 * | 12/2004 | Ohno et al. | 430/270.13 |
| 2005/0265214 A1 * | 12/2005 | Shimomai et al. | 369/275.2 |
| 2005/0270959 A1 * | 12/2005 | Iwasa et al. | 369/116 |
| 2006/0165946 A1 * | 7/2006 | Tabata | 428/64.4 |
| 2007/0121478 A1 * | 5/2007 | Martens et al. | 369/275.1 |
| 2007/0237060 A1 * | 10/2007 | Ohno et al. | 369/275.1 |

FOREIGN PATENT DOCUMENTS

| | | | | |
|---|---|---|---|---|
| JP | 2000-155945 | * | 6/2000 | 369/275.2 |
| JP | 2000-251256 | | 9/2000 | |
| JP | 2002-092889 | * | 3/2002 | 369/275.2 |
| JP | 2002-237089 | | 8/2002 | |
| JP | 2003-109217 | | 4/2003 | |
| JP | 2003-200665 | | 7/2003 | |
| JP | 2003-203340 | * | 7/2003 | 369/275.2 |
| JP | 2003-242676 | | 8/2003 | |
| JP | 2003-272151 A | * | 9/2003 | 369/275.1 |
| JP | 2003-331422 | | 11/2003 | |
| JP | 2004-005920 | | 1/2004 | |
| JP | 2004-013947 | | 1/2004 | |
| JP | 2004-206739 A | * | 7/2004 | 369/275.1 |
| JP | 2005-093012 | | 4/2005 | |
| JP | 2005-093012 A | * | 4/2005 | 369/275.1 |
| JP | 2006-221712 A | * | 8/2006 | 369/275.1 |
| WO | WO 03/069602 | | 8/2003 | |

* cited by examiner

| LAYER L0 | POWER [mW] | LINEAR VELOCITY [m/s] | POWER DENSITY Di [mW·s/(μm²·m)] | REFLECTIVITY ZONE | REFLECTIVITY | | | REFLECTIVITY RATIO | | DOW0 | DOW1 | DOW9 | ε |
|---|---|---|---|---|---|---|---|---|---|---|---|---|---|
| | | | | | R0 | R1 | R9 | R1/R0 | R9/R0 | | | | |
| EMBODIMENT SAMPLE A-1 | 720 | 2 | 3.83 | BH | 5.9 | 6.2 | 6.5 | 1.051 | 1.102 | 7.3 | 8.8 | 8.3 | 0.27 |
| EMBODIMENT SAMPLE A-2 | 740 | 2 | 3.94 | BH | 6.1 | 6.4 | 6.7 | 1.049 | 1.098 | 7.6 | 10.3 | 9.0 | 0.23 |
| EMBODIMENT SAMPLE A-3 | 700 | 2 | 3.72 | BH | 5.7 | 6.3 | 6.6 | 1.105 | 1.158 | 8.6 | 9.6 | 8.8 | 0.38 |
| EMBODIMENT SAMPLE A-4 | 780 | 2 | 4.15 | BH | 6.3 | 6.33 | 6.6 | 1.005 | 1.048 | 7.2 | 8.6 | 8.1 | 0.21 |
| EMBODIMENT SAMPLE A-5 | 610 | 2 | 3.24 | BH | 5.4 | 6.2 | 6.4 | 1.141 | 1.185 | 7.8 | 10.8 | 8.9 | 0.38 |
| EMBODIMENT SAMPLE A-6 | 695 | 2 | 3.70 | BH | 5.7 | 6.4 | 6.8 | 1.123 | 1.193 | 8.6 | 9.8 | 8.8 | 0.27 |
| COMPARATIVE SAMPLE A-7 | 580 | 2 | 3.09 | BL | 5.3 | 6.1 | 6.3 | 1.151 | 1.189 | 7.9 | 11.9 | 10.6 | 0.27 |
| COMPARATIVE SAMPLE A-8 | 720 | 1.7 | 4.51 | C | 6.4 | 6.5 | 6.6 | 1.016 | 1.031 | 11.8 | 11.0 | 9.8 | 0.27 |
| COMPARATIVE SAMPLE A-9 | 760 | 1.7 | 4.76 | D | 6.7 | 6.7 | 6.8 | 1.000 | 1.015 | 8.3 | 14.9 | 10.4 | 0.27 |
| COMPARATIVE SAMPLE A-10 | 720 | 1.8 | 4.26 | C | 6.4 | 6.5 | 6.7 | 1.016 | 1.042 | 11.8 | 11.0 | 10.0 | 0.27 |
| COMPARATIVE SAMPLE A-11 | 580 | 2.1 | 2.94 | BL | 5.3 | 6.1 | 6.4 | 1.151 | 1.208 | 8.0 | 12.1 | 10.8 | 0.27 |
| COMPARATIVE SAMPLE A-12 | 720 | 2 | 3.83 | BH | 6.1 | 6.2 | 6.3 | 1.016 | 1.033 | 9.7 | 19.8 | 13.1 | 0.18 |
| COMPARATIVE SAMPLE A-13 | 720 | 2 | 3.83 | BH | 6.0 | 6.2 | 6.5 | 1.033 | 1.083 | 8.3 | 13.6 | 10.0 | 0.5 |

FIG. 12

| LAYER L1 | POWER [mW] | LINEAR VELOCITY [m/s] | POWER DENSITY [mW·s/(μm²·m)] | REFLECTIVITY ZONE | REFLECTIVITY R0 | REFLECTIVITY R1 | REFLECTIVITY R9 | REFLECTIVITY RATIO R1/R0 | REFLECTIVITY RATIO R9/R0 | DOW0 | DOW1 | DOW9 | ε |
|---|---|---|---|---|---|---|---|---|---|---|---|---|---|
| EMBODIMENT SAMPLE A-1 | 720 | 2 | 3.83 | BH | 6.1 | 6.3 | 6.6 | 1.033 | 1.082 | 7.1 | 8.6 | 8.2 | 0.27 |
| EMBODIMENT SAMPLE A-2 | 740 | 2 | 3.94 | BH | 6.2 | 6.5 | 6.8 | 1.048 | 1.097 | 7.4 | 10.1 | 8.7 | 0.23 |
| EMBODIMENT SAMPLE A-3 | 700 | 2 | 3.72 | BH | 5.8 | 6.5 | 6.7 | 1.121 | 1.155 | 8.4 | 9.5 | 8.6 | 0.38 |
| EMBODIMENT SAMPLE A-4 | 780 | 2 | 4.15 | BH | 6.4 | 6.45 | 6.8 | 1.008 | 1.055 | 7.0 | 8.4 | 8.0 | 0.21 |
| EMBODIMENT SAMPLE A-5 | 610 | 2 | 3.24 | BH | 5.5 | 6.3 | 6.5 | 1.145 | 1.182 | 7.7 | 10.6 | 8.7 | 0.38 |
| EMBODIMENT SAMPLE A-6 | 695 | 2 | 3.70 | BH | 5.8 | 6.4 | 6.9 | 1.103 | 1.190 | 8.6 | 9.8 | 8.8 | 0.27 |
| COMPARATIVE SAMPLE A-7 | 580 | 2 | 3.09 | BL | 5.4 | 6.3 | 6.4 | 1.167 | 1.185 | 7.7 | 11.6 | 10.5 | 0.27 |
| COMPARATIVE SAMPLE A-8 | 720 | 1.7 | 4.51 | C | 6.5 | 6.6 | 6.7 | 1.015 | 1.031 | 11.5 | 10.7 | 9.6 | 0.27 |
| COMPARATIVE SAMPLE A-9 | 760 | 1.7 | 4.76 | D | 6.8 | 6.8 | 6.9 | 1.000 | 1.015 | 8.2 | 14.7 | 10.3 | 0.27 |
| COMPARATIVE SAMPLE A-10 | 720 | 1.8 | 4.26 | C | 6.5 | 6.6 | 6.8 | 1.014 | 1.045 | 11.8 | 11.0 | 10.0 | 0.27 |
| COMPARATIVE SAMPLE A-11 | 580 | 2.1 | 2.94 | BL | 5.4 | 6.1 | 6.5 | 1.140 | 1.215 | 8.0 | 12.1 | 10.8 | 0.27 |
| COMPARATIVE SAMPLE A-12 | 720 | 2 | 3.83 | BH | 6.1 | 6.1 | 6.3 | 1.000 | 1.033 | 9.6 | 19.5 | 12.9 | 0.18 |
| COMPARATIVE SAMPLE A-13 | 720 | 2 | 3.83 | BH | 5.9 | 6.8 | 6.8 | 1.153 | 1.153 | 8.1 | 13.5 | 9.8 | 0.5 |

FIG. 13

| LAYER L0 | POWER [mW] | LINEAR VELOCITY [m/s] | POWER DENSITY [mW·s/(μm²·m)] | REFLECTIVITY ZONE | REFLECTIVITY | | | REFLECTIVITY RATIO | | DOW0 | DOW1 | DOW9 | ε |
|---|---|---|---|---|---|---|---|---|---|---|---|---|---|
| | | | | | R0 | R1 | R9 | R1/R0 | R9/R0 | | | | |
| EMBODIMENT SAMPLE B-1 | 620 | 3 | 2.20 | BH | 6.9 | 7.3 | 7.6 | 1.058 | 1.101 | 7.4 | 9.0 | 8.3 | 0.27 |
| EMBODIMENT SAMPLE B-2 | 640 | 3 | 2.27 | BH | 7.1 | 7.4 | 7.8 | 1.042 | 1.099 | 7.6 | 10.6 | 9.0 | 0.23 |
| EMBODIMENT SAMPLE B-3 | 600 | 3 | 2.13 | BH | 6.7 | 7.4 | 7.7 | 1.104 | 1.149 | 8.7 | 9.9 | 8.9 | 0.38 |
| EMBODIMENT SAMPLE B-4 | 680 | 3 | 2.41 | BH | 7.2 | 7.24 | 7.6 | 1.006 | 1.056 | 7.3 | 8.8 | 8.3 | 0.21 |
| EMBODIMENT SAMPLE B-5 | 510 | 3 | 1.81 | BL | 6.4 | 7.3 | 7.6 | 1.141 | 1.188 | 7.2 | 10.9 | 9.0 | 0.38 |
| COMPARATIVE SAMPLE B-6 | 480 | 3 | 1.70 | BL | 6.3 | 7.3 | 7.5 | 1.159 | 1.19 | 8.0 | 12.3 | 11.1 | 0.27 |
| COMPARATIVE SAMPLE B-7 | 620 | 2.5 | 2.64 | C | 7.4 | 7.5 | 7.6 | 1.014 | 1.027 | 12.2 | 12.0 | 10.2 | 0.27 |
| COMPARATIVE SAMPLE B-8 | 660 | 2.5 | 2.81 | D | 7.7 | 7.7 | 7.8 | 1.000 | 1.013 | 8.4 | 16.5 | 10.6 | 0.27 |
| COMPARATIVE SAMPLE B-9 | 620 | 2.8 | 2.36 | C | 7.4 | 7.6 | 7.7 | 1.027 | 1.041 | 11.8 | 11.0 | 10.0 | 0.27 |
| COMPARATIVE SAMPLE B-10 | 480 | 3.1 | 1.65 | BL | 6.4 | 7.2 | 7.8 | 1.125 | 1.219 | 8.0 | 12.1 | 10.8 | 0.27 |
| COMPARATIVE SAMPLE B-11 | 620 | 3 | 2.20 | BH | 7.1 | 7.2 | 7.3 | 1.014 | 1.028 | 9.9 | 20.3 | 14.1 | 0.18 |
| COMPARATIVE SAMPLE B-12 | 620 | 3 | 2.20 | BH | 7.0 | 7.2 | 7.6 | 1.029 | 1.086 | 8.3 | 14.2 | 10.3 | 0.5 |

FIG. 14

PHASE-CHANGE RECORDING MEDIUM HAVING THE RELATION BETWEEN PULSE PATTERNS AND REFLECTIVITY OF UN-RECORDED SECTION

CROSS-REFERENCE TO RELATED APPLICATIONS

This application is based on and claims the benefit of priority from the prior Japanese Patent Application No. 2004-023432 filed on Jan. 30, 2004, the entire content of which is incorporated herein by reference.

BACKGR0UND OF THE INVENTION

The present invention relates to an optical storage medium in or from which data is recorded, erased or reproduced with irradiation of a light beam (for example, a laser beam).

Phase-change optical storage media are data-rewritable storage media, such as, recent CD-RW, DVD-RW and DVD-RAM. Especially, DVD-RW and DVD-RAM are used for recording and rewriting a large amount of data, such as video data. What are required for phase-change optical storage media are excellent overwrite characteristics as well as recording characteristics. Also required is a recording method that allows a larger storage capacity.

One particular recording method that allows a larger storage capacity is to make smaller a laser-beam spot emitted onto a recording layer of an optical storage medium from a laser-beam source of a recording/reproducing apparatus to create a highly-dense signal to be recorded. Studied so far for achieving this method are, for example, shorting a wavelength of a laser beam to be used to a range of blue color or converging a laser beam further with a larger aperture ratio (NA) for an objective lens attached to an optical pick up of a recording/reproducing apparatus. This method, however, has difficulty in reproduction compatibility with digital multi-use disk (DVD) recording/reproducing (or reproduction only) apparatus.

A recently proposed method for increasing a storage capacity while maintaining reproduction compatibility is stacking several layers on an optical storage medium which is, for example, a dual-layer structure for optical storage media.

Dual-layer phase-change optical storage media have a structure in which a first layer having a first recording layer and a second layer having a second recording layer are bonded to each other with an ultraviolet-cured resin, for example. The first layer has a structure in which at least a dielectric film, a recording layer, another dielectric film and a reflective layer are laminated in order on a substrate having a bottom surface to be irradiated with a laser beam carrying a recording or reproducing power, or an erasing power. The second layer has a structure in which at least a dielectric film, a recording layer, another dielectric film and a reflective layer are laminated in order on a substrate. The recording layers come into an amorphous phase with low reflectivity when right after formed by sputtering, for example. They are thus initialized with irradiation of a laser beam, for example, to come into a crystalline phase with a high reflectivity when products are shipped. Each of the first and second layers requires higher transparency for the dielectric film with smaller light absorption effect.

A recording method for conventional rewritable phase-change optical storage media is as follows: In a phase-change optical storage medium having such a structure, recording pulses are applied (emitted) onto a recording layer with a laser beam having a recording power, to melt and rapidly cool down the recording layer, thus forming amorphous recorded marks thereon. Reflectivity of the recorded marks lower than that of the crystalline-phase recording layer allows optical reading of the marks as recorded data. In erasing the recorded marks, a laser beam having a power (erasing power) smaller than the recording power is emitted onto the recording layer to raise the temperature thereof to the crystallization temperature or higher to change the recording layer from the amorphous phase to the crystalline phase for erasing the recorded marks, thus overwriting being enabled.

Japanese Patent No. 2962052 proposes a method to achieve a higher reflectivity on un-recorded sections than that on recorded sections, to improve recording density and repeatability. There is, however, no description for high-speed storage media. Moreover, the inventors of the present invention found that this requirement only cannot provide sufficient overwrite characteristics (particularly at initial overwriting) at high recording speed at high recording density, recently required.

Japanese Unexamined Patent Publication Nos. 2002-237089 and 2003-200665 propose an optical recording method or an optical storage medium in which reflectivity of un-recorded sections is made lower than that of recorded sections for excellent jitter and overwrite characteristics in high-speed recording. However, the inventors of the present invention found that the proposed optical recording method and optical storage medium cannot achieve sufficient overwrite characteristics (particularly at initial overwriting) at high linear velocity (for example, DVD×2 speed or higher).

Dual-layer optical storage media require that a recording laser beam passes through the first layer in recording to the recording layer of the second layer. The entire film that constitutes the first layer requires approximately 50% in transmissivity of a laser beam to achieve sufficient recording to the second layer. The inventors of the present invention found that this is the reason why the reflective film of the first layer cannot be formed as having a thickness that exhibits a sufficient cooling effect, thus not achieving sufficient recording and overwrite characteristics.

Japanese Unexamined Patent Publication No. 2003-242676 proposes a method in which a ratio of elements (Sb/Te) that constitute the first layer is lowered to have a crystallization speed slower than that of the second layer, for solving a problem in that it is difficult to provide a semi-transparent reflective film used in the first layer with a high transparency and also a high rapid cooling effect to the recording layer, thus not achieving acceptable recording and reproduction characteristics. This method achieves sufficient crystallization in the recording layer of the first layer which hardly enjoys a rapid cooling effect, thus providing acceptable recording and reproduction characteristics. Nevertheless, this method has difficulty in recording at high linear velocity due to slower crystallization speed. In another words, an alternative to the conventional method described above is required for optical storage media having one or more of layers for recording at high linear velocity.

As discussed above, the conventional optical storage media have a problem in that phase-change optical storage media having one or more of layers suffer excessive jitter in one-time or plural times of overwriting (particularly at initial overwriting), thus having difficulty in providing sufficient overwrite characteristics in high linear velocity recording.

SUMMARY OF THE INVENTION

The present invention is achieved to solve the problems discussed above and has a purpose to provide a phase-change optical storage medium that exhibits excellent recording characteristics even at higher recording speed and maintains excellent overwrite recording characteristics in, especially, one-time or plural times of overwriting.

Another purpose of the present invention is to provide a phase-change optical storage medium that exhibits excellent recording and overwrite characteristics without making slower the crystallization speed of some of multi recording layers.

The present invention provides a phase-change optical storage medium comprising: a substrate; and a recording layer, to be recorded on which is at least one recorded mark representing information to be recorded by irradiating a recording light beam onto the recording layer in accordance with a recording pulse pattern of recording pulses rising from an erasing power and formed between a recording power larger than the erasing power and a bottom power smaller than the erasing power and of erasing pulses rising from the bottom power to the erasing power, wherein expressions (1) and (2): $1.00 < (R1/R0) < 1.15 \ldots (1)$, $1.05 < (R9/R0) < 1.20 \ldots (2)$ are satisfied for the recording layer, in which $R0$ is a reflectivity exhibited by an un-recorded section of the recording layer, on which no data has ever been recorded, when irradiated with a reproducing light beam, $R1$ is a reflectivity exhibited by the un-recorded section when irradiated with the reproducing light beam, after irradiated once with the recording light beam in accordance with the recording pulse pattern, and $R9$ is a reflectivity exhibited by the un-recorded section when irradiated with the reproducing light beam, after irradiated nine times with the recording light beam in accordance with the recording pulse pattern.

BRIEF DESCRIPTION OF DRAWINGS

FIG. 12 is a view showing recording characteristics of the layer L0 in embodiment samples A-1 to A-6 and comparatives samples A-7 to A-13;

FIG. 13 is a view showing recording characteristics of the layer L1 in the embodiment samples A-1 to A-6 and the comparatives samples A-7 to A-13; and FIG. 14 is a view showing recording characteristics of the layer L0 in embodiment samples B-1 to B-5 and comparatives samples B-6 to B-12.

DETAILED DESCRIPTION OF PREFERRED EMBODIMENTS

Figure 1:
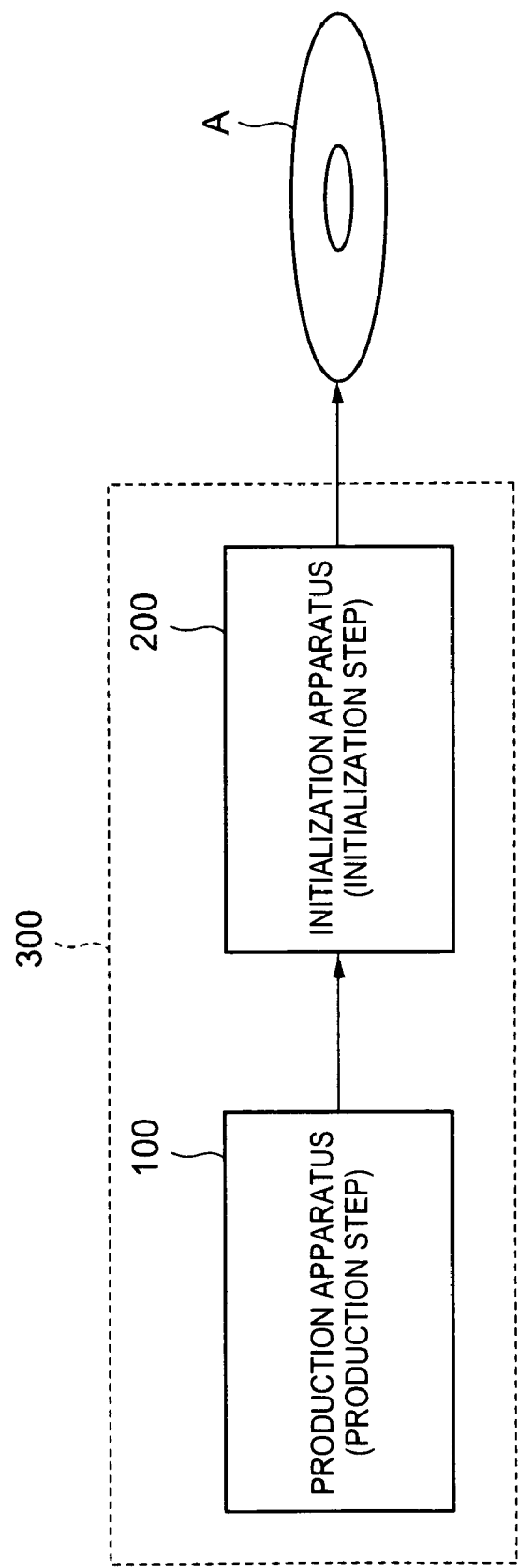
FIG. 1 is a view illustrating a production system 300 for phase-change optical storage media or production and initialization steps performed at the production system 300.

FIG. 1 is a view illustrating a production system 300 for producing phase-change optical storage media or production and initialization steps performed at the production system 300. A production apparatus (production step) 100 produces phase-change optical storage media and an initialization apparatus (initialization step) 200 initializes the phase-change optical storage media. Each phase-change optical storage medium subjected to the initialization process is shipped as an optical storage medium A.

Representative of phase-change optical storage media are phase-change optical disks such as DVD-RW, media capable of repeatedly overwriting data such as optical cards, and so on. A phase-change optical disk (an optical storage medium A) is described in the following description as an embodiment of a phase-change optical storage medium. It will, however, be appreciated that the present invention is applicable to other types of phase-change optical storage media such as optical cards.

[Structure of Optical Storage Medium]

Figure 2:
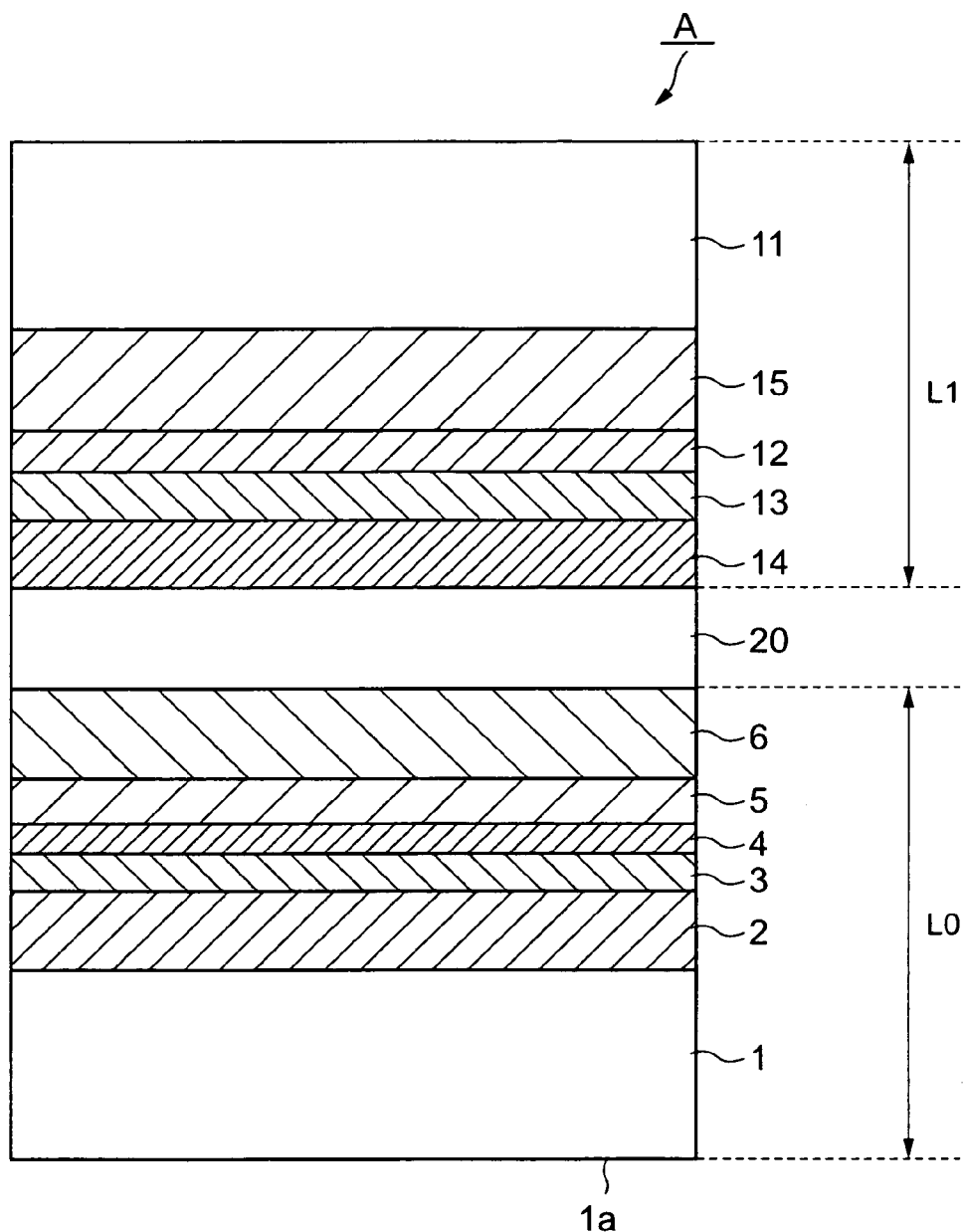
FIG. 2 is an enlarged cross section illustrating an embodiment of an optical storage medium according to the present invention.

FIG. 2 is an enlarged cross section illustrating an optical storage medium A, an embodiment of the present invention. The optical storage medium A has a first layer (layer L0) having a bottom surface that is an incident plane 1a on which a recording or reproducing laser beam, or an erasing laser beam is incident, and a second layer (layer L1), bonded to each other with a transparent layer 20, as its basic structure.

The layer L0 has a structure in which a first dielectric film 2, a recording layer 3, a second dielectric film 4, a semi-transparent reflective layer 5 (termed as reflective layer 5 hereinafter for short) are laminated in order on a substrate 1 having a bottom surface that is the incident plane 1a on which a recording or reproducing laser beam, or an erasing laser beam is incident. A protective layer 6 is provided on the reflective layer 5. It is, however, provided according to necessity, as described later.

The layer L1 has a structure in which a reflective layer 15, a third dielectric film 12, a recording layer 13, and a fourth dielectric film 14, are laminated in order on a substrate 11.

Materials for the layers and films that constitute the layers L0 and L1 are as follows:

Suitable materials for the substrate 1 are several types of transparent synthetic resins, a transparent glass, and so on. The transparent substrate 1 is used for protection against dust, damage, etc. A focused laser beam reaches the recording layer 3 through the incident plane 1a of the substrate 1 in data recording. Suitable materials for the substrate 1 in such use are, for example, glass, polycarbonate, polymethylmethacrylate, polyolefin resin, epoxy resin, or polyimide resin. Most suitable material is polycarbonate resin for low birefringence and hygroscopicity, and also easiness to process.

Suitable materials for the substrate 11 are those the same as for the substrate 1 for higher productivity, for example, although there is no need for the substrate 11 to consider such a high transparency required for the substrate 1, dust attachment, damage, etc.

Although not limited, in compatibility with DVD, the thicknesses of the substrates 1 and 11 are preferably in the range from 0.01 mm to 0.6 mm, particularly, 0.6 mm (for the total DVD thickness of 1.2 mm). This is because dust easily affect recording with a focused laser beam through the incident plane 1a of the substrate 1 when the thickness of the substrate 1 is less than 0.01 mm. A practical thickness for the substrate 1 is in the range from 0.01 mm to 5 mm if there is no particular requirement for the total thickness of the optical storage medium. The thickness over 5 mm causes difficulty in increase in objective-lens numerical aperture, which leads to larger laser spot size, hence resulting in difficulty in increase in storage density.

The substrates 1 and 11 may be flexible or rigid. A flexible substrate 1 is used for tape-, sheet- or card-type optical storage media whereas a rigid substrate 1 for card- or disk-type optical storage media.

The first and second dielectric films 2 and 4 protect the substrate 1 and the recording layer 3 against heat in recording which may otherwise cause inferior recording characteristics and also against optical interference which may otherwise cause low signal contrast in reproduction. The third and fourth dielectric films 12 and 14 also provide the same advantages to the substrate 11 and the recording layer 13 as given by the first and second dielectric films 2 and 4.

The first dielectric film 2, the second dielectric film 4, the third dielectric film 12, and the fourth dielectric film 14 (the first to fourth dielectric films) allow a laser beam to pass therethrough in recording, reproduction or erasing and exhibits a refractive index "n", preferably, in the range of $1.9 \leq n \leq 2.3$. A suitable material for the first to fourth dielectric films is a material that exhibits high thermal characteristics, for example, an oxide such as $SiO_2$, $SiO$, $ZnO$, $TiO_2$, $Ta_2O_5$, $Nb_2O_5$, $ZrO_2$ or $MgO$, a sulfide such as $ZnS$, $In_2S_3$ or $TaS_4$, or carbide such as $SiC$, $TaC$, $WC$ or $TiC$, or a mixture of these materials. Among them, a mixture of $ZnS$ and $SiO_2$ is the best for high recording sensitivity, C/N and erasing rate against repeated recording, reproduction or erasure.

The first to fourth dielectric films may or may not be made of the same material or composition.

The thickness of the first dielectric film 2 is in the range from about 5 nm to 500 nm, preferably, 40 nm to 300 nm so that it cannot be easily peeled off from the substrate 1 or the recording layer 3 and is not prone to damage such as cracks. The thickness below 40 nm hardly offers high disk optical characteristics whereas over 300 nm causes lower productivity. A more acceptable range is from 50 nm to 80 nm.

The thickness of the second dielectric film 4 is, preferably, in the range from 5 nm to 40 nm for high recording characteristics such as C/N and erasing rate, and also high stability in a number of repeated overwriting. The thickness below 5 nm hardly gives enough heat to the recording layer 3, resulting in increase in optimum recording power, whereas over 40 nm causes inferior overwrite characteristics. A more acceptable range is from 5 nm to 20 nm.

The thickness of the third dielectric film 12 is approximately in the range from 5 nm to 500 nm.

The thickness of the fourth dielectric film 14 is, preferably, in the range from 5 nm to 40 nm for high recording characteristics such as C/N and erasing rate, and also high stability in a number of repeated overwriting. The thickness below 5 nm hardly gives enough heat to the recording layer 13, resulting in increase in optimum recording power, whereas over 40 nm causes inferior overwrite characteristics. A more acceptable range is from 10 nm to 20 nm.

The recording layers 3 and 13 are a layer of an alloy such as Ag—In—Sb—Te or Ge—In—Sb—Te, or of Ge—In—Sb—Te added with at least any one of Ag, Si, Al, Ti, Bi and Ga. The thickness of the recording layer 3 is preferably 10 nm or less. A preferable thickness range for the recording layer 13 is from 10 nm to 25 nm.

The layer L0 requires approximately 50% in transmissivity of a laser beam, as discussed above. Among the layers and films that constitute the layer L0, the recording layer 3 and the reflective layer 5 that exhibit high light absorption affect transmissivity. The thickness of the recording layer 3 is preferably 10 nm or less for achieving at least 50% in modulation amplitude for reproduced signals (RF signals), acceptable DOW-jitter characteristics, and also sufficient transmissivity. The thickness over 10 nm hardly achieves approximately 50% in transmissivity for the layer L0. A more acceptable range is from 5 nm to 10 nm.

Here, transmissivity is defined as light transmissivity of a layer that consists of a range from the incident plane 1a of the substrate 1 to the upper surface (border surface with the protective layer 6) of the reflective layer 5 when the substrate 1 is the lower side and the substrate 11 is the upper side in FIG. 2. In other words, transmissivity T is light transmissivity determined by all substances (layers) included in the range from the incident plane 1a of the substrate 1 to the upper surface of the reflective layer 5.

An interface layer may be provided on either or each surface of the recording layer 3. One requirement for the interface layer is that it is made of a material without including a sulfide. An interface layer made of a material including a sulfide causes diffusion of the sulfide into the recording layer 3 due to repeated overwriting, which could lead to inferior recording characteristics, and also inferior erasing characteristics.

An acceptable material for the interface layer includes at least any one of a nitride, an oxide and a carbide, specifically, germanium nitride, silicon nitride, aluminum nitride, aluminum oxide, zirconium oxide, chromium oxide, silicon carbide and carbon. Oxygen, nitrogen or hydrogen may be added to the material of the interface layer. The nitride, oxide and carbide listed above may not be stoichiometric compositions for such an interface layer. In other words, nitrogen, oxygen or carbon may be excessive or insufficient, which could offer high performance, such as high durability in that the interface layer is hardly peeled off.

The recording layer 13 may also be provided with such an interface layer, like the recording layer 3.

Preferable materials for the reflective layers 5 and 15 are a metal exhibiting light reflectivity, such as Al, Au or Ag, an alloy of any of these metals as a major component with at least one type of metal or semiconductor, and a mixture of a metal, such as Al, Au or Ag, and a metal nitride, a metal oxide or a metal chalcogen of Al, Si, etc.

Most preferable among them is a metal, such as Al, Au or Ag, or an alloy of any of these metals as a major component, for high reflectivity and thermal conductivity. A typical alloy is made of Al and at least one of the following elements: Si, Mg, Cu, Pd, Ti, Cr, Hf, Ta, Nb, Mn, Zr, etc., or Au or Ag and at least one of the following elements: Cr, Ag, Cu, Pd, Pt, Ni, Nd, In, Ca, etc. For high linear velocity recording, the most preferable one is a metal or an alloy having Ag exhibiting extremely high thermal conductivity as a major component, in view of recording characteristics.

The reflective layers 5 and 15 may be made of different materials under consideration of reflectivity, thermal conductivity, etc.

The reflective layer 5 also affects transmissivity of the layer L0, as discussed above. Thus, the thickness of the (semi-transparent) reflective layer 5 is preferably 10 nm or less for higher light transmissivity to the recording layer 13 of the layer L1. A thickness of 300 nm or more is preferably obtained by fabrication while controlling the layer thickness with a material that exhibits a high thermal conductivity due to longer fabrication time.

The thickness of the reflective layer 15 is, preferably, in the range from 50 nm to 300 nm, which depends on the thermal conductivity of a material used for this layer. The reflective layer 15 of 50 nm or more in thickness is optically stable in, particularly, reflectivity. Nevertheless, a thicker reflective layer 15 affects a cooling rate. Thickness over 300 nm requires a longer production time. A material exhibiting a high thermal conductivity allows the reflective layer 15 to have a thickness in an optimum range such as mentioned above.

An ultraviolet (UV)-cured resin, a double-sided adhesive sheet, etc., may be used for a transparent layer 20.

[Optical Storage Medium Production Method]

Disclosed next is a method of producing an optical storage medium at the production apparatus 100. Discussed below is a method of laminating the layers, that constitute the layer L0, on the substrate 1 of the layer L0. The same method is applied to laminating the layers, that constitute the layer L1, on the substrate 11 of the layer L1. The first and second dielectric films 2 and 4 of the layer L0 correspond to the third and fourth dielectric films 12 and 14 of the layer L1, respectively. The recording layer 3 of the layer L0 corresponds to the recording layer 13 of the layer L1. The reflective layer 5 of the layer L0 corresponds to the reflective layer 15 of the layer L1.

Lamination of the first dielectric film 2, the recording layer 3, the second dielectric film 4, the reflective layer 5, etc., on the substrate 1 is achieved by any known vacuum thin-film forming technique, such as, vacuum deposition (with resistive heating or electron bombardment), ion plating, (D.C., A.C. or reactive) sputtering. The most feasible among the techniques is sputtering for easiness of composition and film-thickness control.

A film-forming system feasible in this method is a batch system in which a plural number of substrates 1 are simultaneously subjected to a film forming process in a vacuum chamber or a single-wafer system in which substrates 1 are processed one by one. The thickness of the first dielectric film 2, the recording layer 3, the second dielectric film 4, the reflective layer 5, etc., can be adjusted with control of power to be supplied and its duration in sputtering or monitoring conditions of deposited layers with a crystal oscillator.

The first dielectric film 2, the recording layer 3, the second dielectric protective layer 4, the reflective layer 5, etc., can be formed while each substrate 1 is being stationary, transferred or rotating. Rotation of the substrate (and further with orbital motion) is most feasible for higher uniformity. An optional cooling process minimizes warpage of the substrate 1.

A dielectric film of ZnS, SiO$_2$, etc., or a resin protective layer made of, for example, an ultraviolet-cured resin may be provided as the protective layer 6 according to necessity, after the reflective layer 5, etc., are formed, to protect those layers already formed against deformation, in the extent which does not make the present invention extremely less advantageous.

The layers L0 and L1 formed by the method disclosed above are bonded to each other with the transparent layer 20 so that the protective layer 6 and the forth dielectric film 14 face each other as being sandwiched by the substrates 1 and 11.

A dual-layer optical storage medium may further be produced by the following method: At least a first dielectric film, a first recording layer, a second dielectric film and a first reflective layer are laminated in order on a substrate having a bottom surface to be irradiated with a laser beam carrying a recording or reproducing power, or an erasing power. An ultraviolet-cured resin is then applied on the first reflective layer. It is irradiated with ultraviolet rays while a transparent stamper to be used in recording-groove transformation is being attached thereon, thus forming an ultraviolet-cured film thereon. The transparent stamper is then detached therefrom. Succeedingly, a third dielectric film, a second recording layer, a fourth dielectric film and a second reflective layer are laminated in order on the ultraviolet-cured film, thus fabricating the dual-layer optical storage medium.

The optical storage medium is shipped as the optical storage medium A after subjected to the initialization step at the initialization apparatus 200. Initialization is a process of radiating a laser beam or light of a xenon flash lamp onto the recording layers 3 and 13 so that the layers are heated and thus their materials are crystallized. Initialization with a laser beam is a better choice for less noise in reproduction. An initialization laser beam is focused and emitted on the recording layer 3 and then the recording layer 13.

Figure 3:
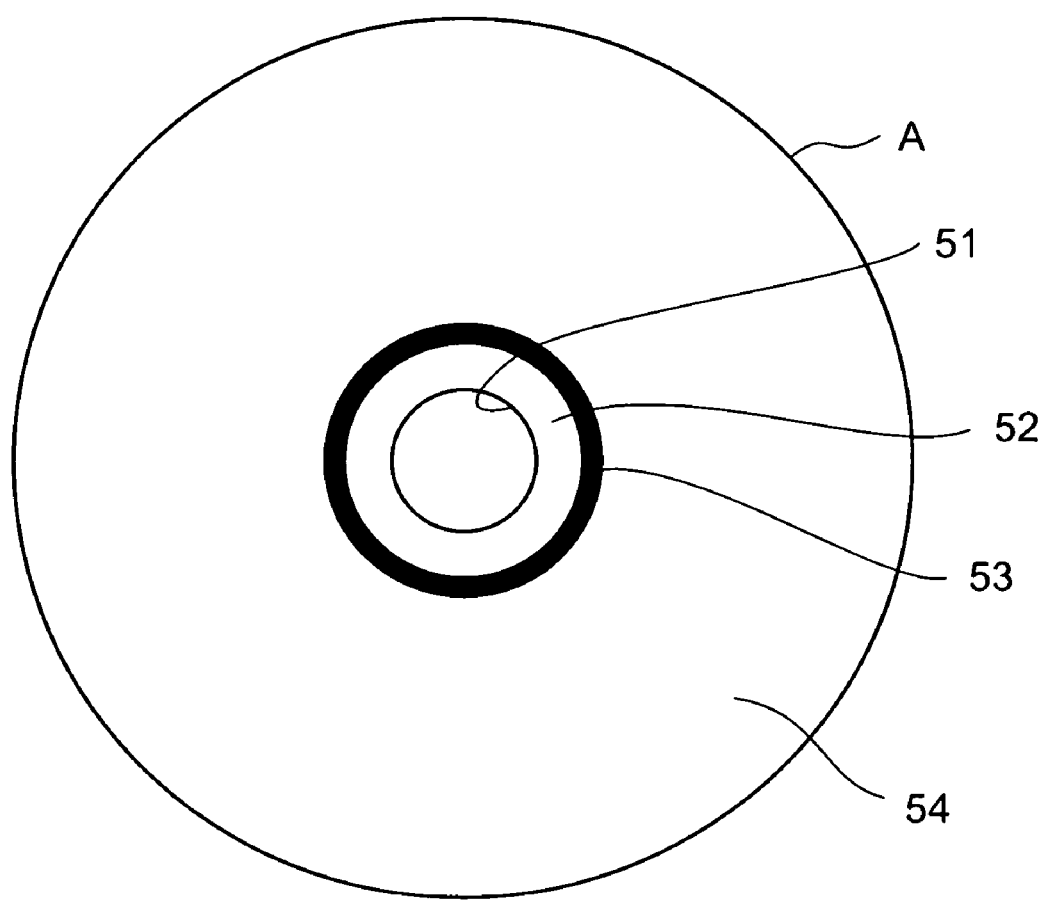
FIG. 3 is a plan view illustrating an embodiment of an optical storage medium according to the present invention.

FIG. 3 is a plan view illustrating the optical storage medium A. The optical storage medium A has a center hole 51 and a clamp area 52 therearound. Provided concentrically around the clamp area 52 is a data area (read-in area) 53 provided around which is a recording area 54 that stores actual data such as video data and audio data. The read-in area 53 may be in a condition like ROM (Read Only Memory) or RAM (Random Access Memory). Alternatively, a high-frequency wobble or bits can be formed in a laser guide groove for gaining a tracking signal, as read-only recorded data.

[Recording Method to Optical Storage Medium]

Figure 4:
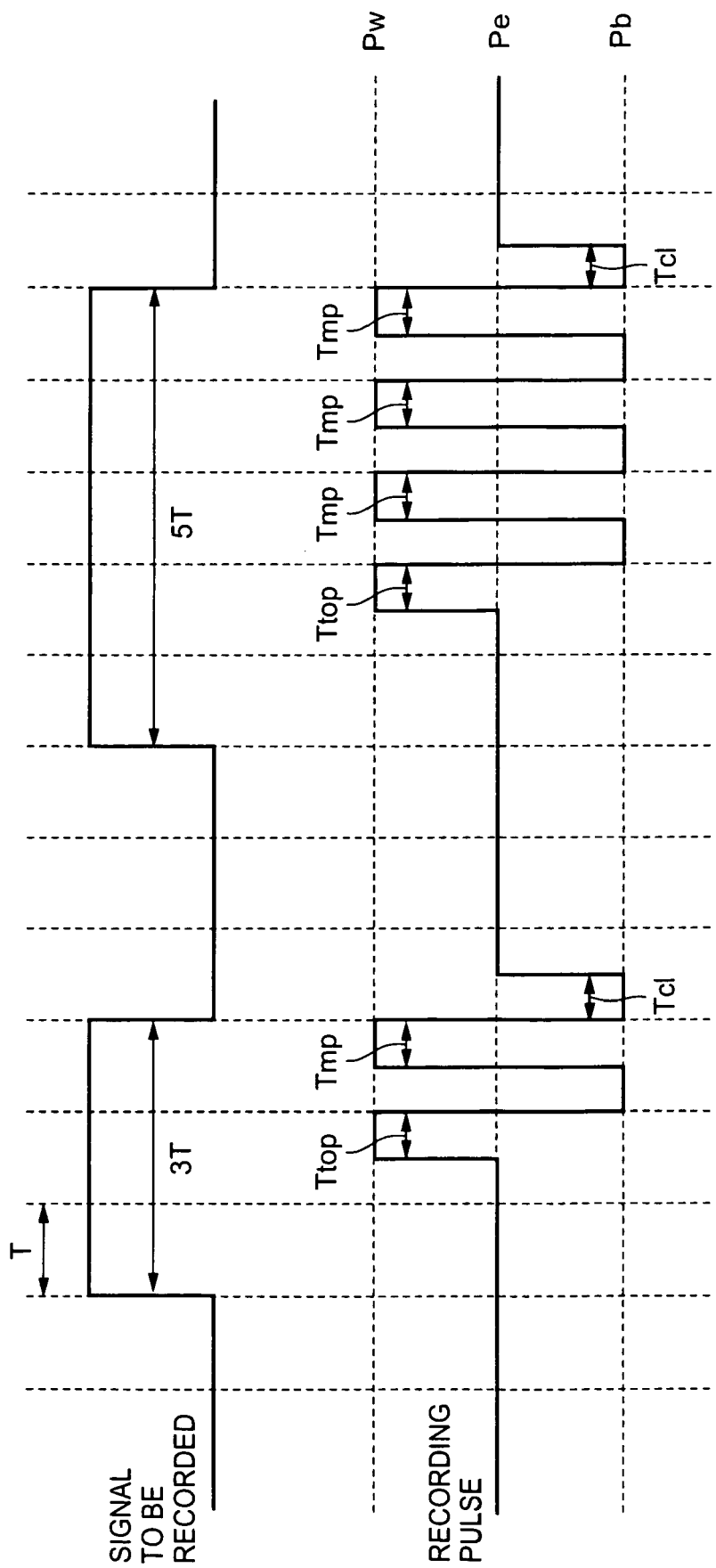
FIG. 4 is a view illustrating a first example of a recording pulse pattern.

FIG. 4 illustrates a recording pulse pattern to be used in recording data on the optical storage medium A. A laser beam is modulated with laser strength at three levels (a recording power Pw, an erasing power Pe and a bottom power Pb) based on the recording pulse pattern, with increase or decrease in the number of pulses in accordance with a mark length carried by a signal to be recorded, to form recorded marks having a given mark length on the recording layers 3 and 13. In terms of laser strength, the recording power Pw is the largest, the erasing power Pe the smaller, and the bottom power Pb the smallest.

As illustrated in FIG. 4, the recording pulse pattern consists of a top pulse Ttop that rises from the erasing power Pe for initially applying a laser beam onto the recording layers 3 and 13 with the recording power Pw, multipulses Tmp, that follows the top pulse Ttop, for alternatively applying the recording power Pw and the bottom power Pb, and an erasing pulse Tcl, located at the end of the pattern, that rises from the bottom power Pb in application of a laser beam with the erasing power Pe. The top pulse Ttop and the multipulses Tmp constitute a recording pulse for recording a recorded mark on the recording layers 3 and 13. A recording pulse may be formed only with the top pulse Ttop with no multipulses Tmp.

For example, in DVD-RW, there are ten types of mark length, that is, 3T, 4T, 5T, 6T, 7T, 8T, 9T, 10T, 11T, and 14T. In general, the number of the multipulses Tmp is (n−1) or (n−2) when a mark length is expressed as nT. FIG. 4 indicates (n−2) for the multipulses. Here, T indicates a unit clock, 1T=38.2 ns at DVD×1 speed (recording linear velocity: 3.5 m/s), 1T=9.6 ns at DVD×4 speed (recording linear velocity: 14.0 m/s) for DVD-RW.

Figure 5:
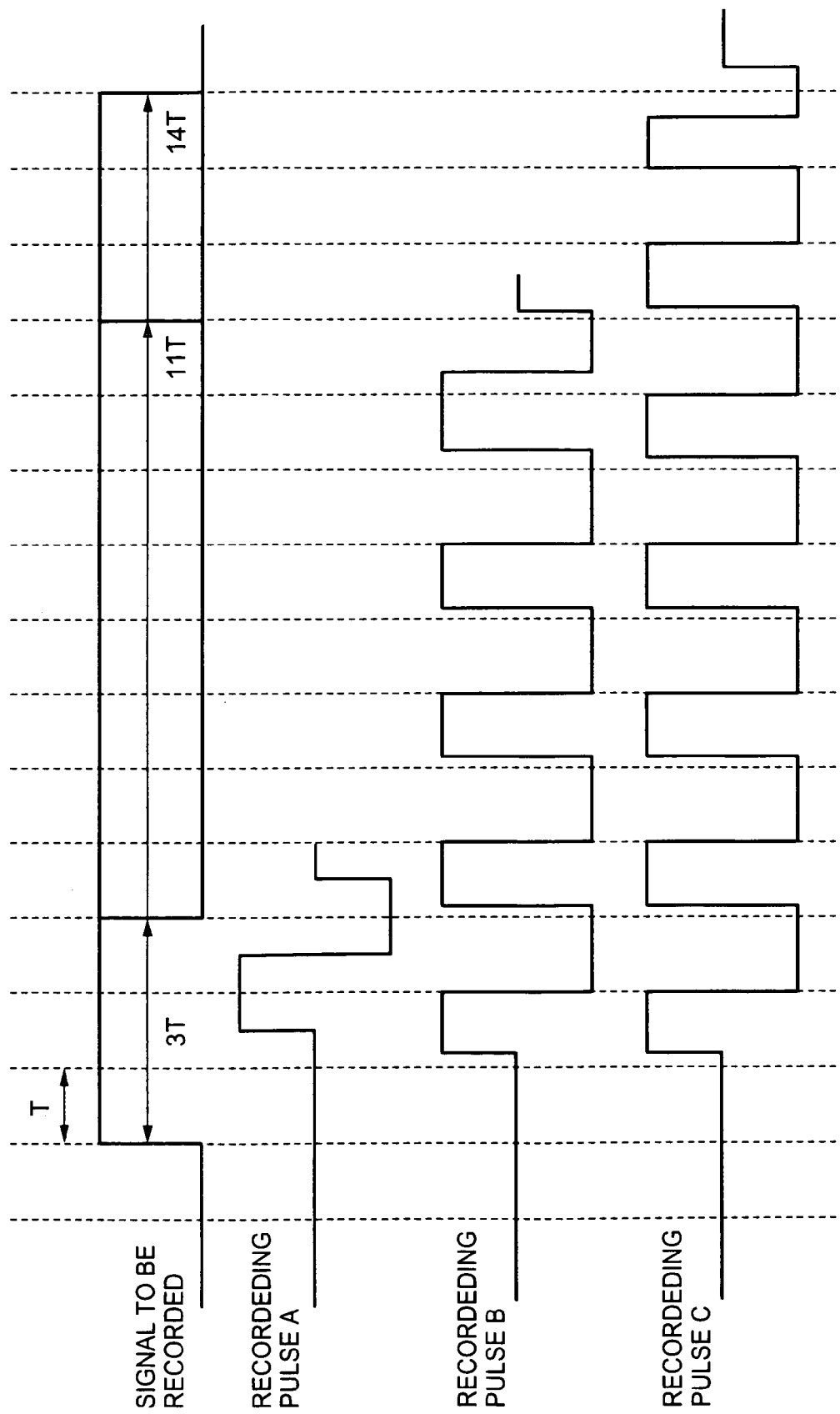
FIG. 5 is a view illustrating a second example of a recording pulse pattern.

A 2T-based recording pulse pattern such as shown in FIG. 5 is applicable to recent high-speed recording with a short unit clock in the order of several nanoseconds, in view of the limit of response of laser pulses in raising and falling. In FIG. 5, recording pulses A, B and C have recording pulse patterns for recording recorded marks having mark lengths of 3T, 11T and 14T, respectively.

[Optical Recording Apparatus]

Figure 6:
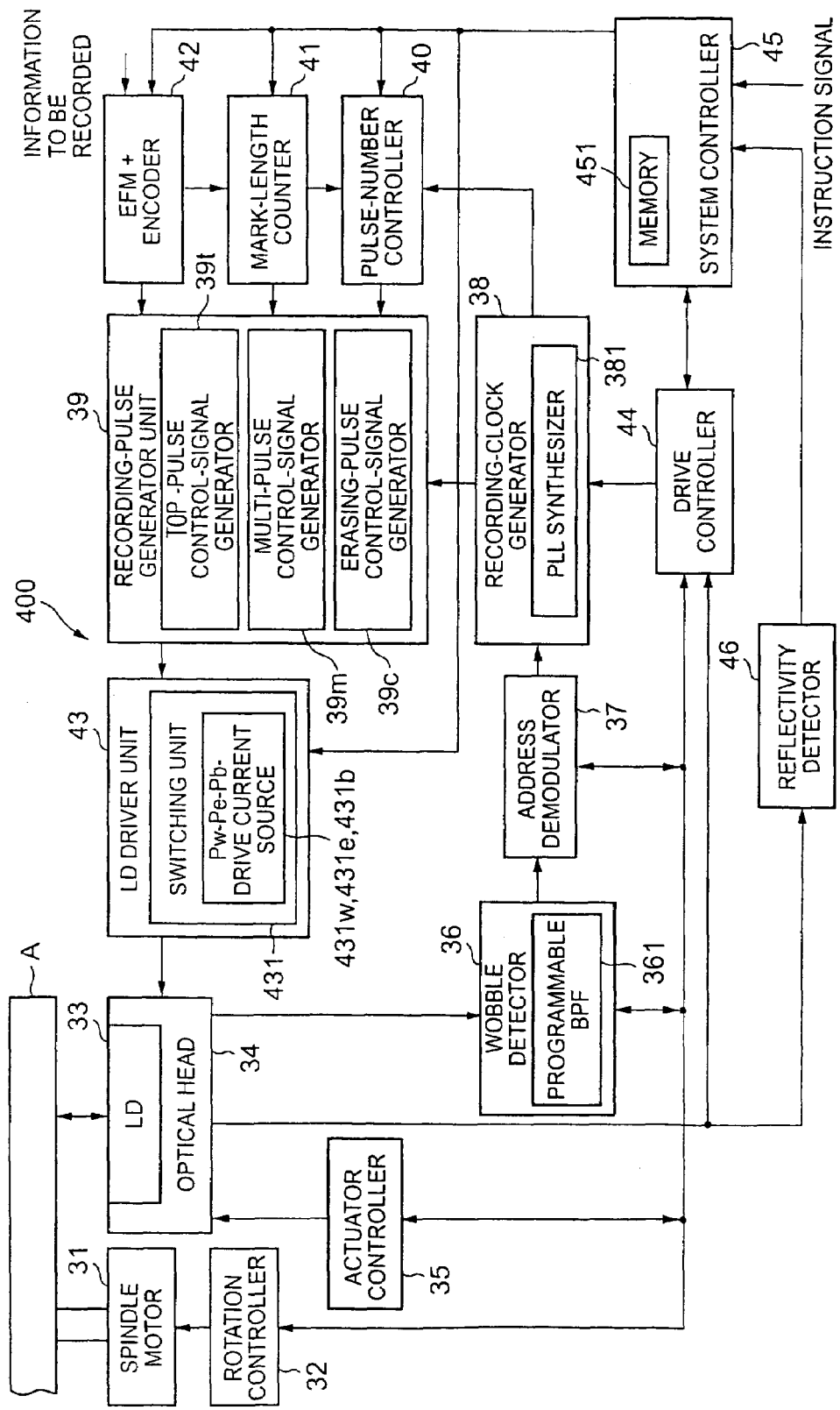
FIG. 6 is a block diagram of an embodiment of an optical recording apparatus according to the present invention.

FIG. 6 shows an embodiment of an optical recording apparatus according to the present invention, for irradiating a laser beam having a given recording pulse pattern onto the optical storage medium A.

The optical storage medium A is rotated by a spindle motor 31. The spindle motor 31 is controlled by a rotation controller 32 so that its rotating speed reaches a recording linear velocity corresponding to a target recording speed. Provided as movable in the radius direction of the optical storage medium A is an optical head 34 equipped with a semiconductor laser (LD) 33 for use in recording, reproduction or erasing to the optical storage medium A, an objective lens (not. shown) for focusing an irradiated laser beam of the LD 33, and a quadrant (for example) photo-detector (not shown).

A recommendable light source for recording in the optical recording apparatus of this embodiment is a high-intensity light source of a laser beam or strobe light, for example. Most recommendable is a semiconductor laser for compactness, low power consumption and easiness in modulation.

The drive controller 44 controls an actuator controller 35 based on the supplied focus and tracking error signals. The actuator controller 35 controls the optical head 34 in focusing and tracking to the optical storage medium A. The reflectivity detector 46 detects a reflectivity based on the supplied signal thus reproduced and outputs a detected result to a system controller 45.

The wobble detector 36, equipped with a programmable band-pass filter (BPF) 361, outputs a detected wobble signal to an address demodulator 37. The address demodulator 37 demodulates and outputs an address from the detected wobble signal. The demodulated address is input to a recording-clock generator 38, equipped with a PLL synthesizer 381, which generates a recording-channel clock and outputs it to a recording-pulse generator unit 39 and a pulse-number controller 40.

The recording-clock generator 38 is controlled by the drive controller 44. Also controlled by the drive controller 44 are the rotation controller 32, the actuator controller 35, the wobble detector 36, the address demodulator 37, and the system controller 45.

The drive controller 44 outputs the wobble signal supplied from the wobble detector 36 to the recording-clock generator 38, and also the address data supplied from the address demodulator 37 to the system controller 45.

The system controller 45, having the memory 451, controls an EFM+ encoder 42, a mark-length counter 41, the pulse-number controller 40, and an LD driver unit 43. The EFM+ encoder 42 modulates input information to be recorded into modulated data with 8-16 modulation and outputs it to the recording-pulse generator unit 39 and the mark-length counter 41. The mark-length counter 41 works as a mark-length generator that counts intervals of inversion of the modulated data to generate mark-length data, the counted value being output to the recording-pulse generator unit 39 and the pulse-number controller 40. The pulse-number controller 40 controls the recording-pulse generator unit 39 to generate specific recording pulses based on the supplied counted value and recording-channel clock.

The recording-pulse generator unit 39 is equipped with a top-pulse control-signal generator 39$t$, a multipulse control-signal generator 39$m$, and an erasing-pulse control-signal generator 39$c$. The top-pulse control-signal generator 39$t$, the multipulse control-signal generator 39$m$, and the erasing-pulse control-signal generator 39$c$ generate a top-pulse control signal, a multipulse control signal, and an erasing-pulse control signal, respectively. Each control signal is supplied to the LD driver unit 43. A switching unit 431 switches a drive current source 431$w$ for recording power Pw, the drive current source 431$e$ for erasing power Pe, and a drive current source 431$b$ for bottom power Pb based on the supplied control signals, thus generating a recording pulse pattern.

The Pw-drive current source 431$w$, the Pe-drive current source 431$e$, and the Pb-drive current source 431$b$ supply currents to the optical head 34 based on a recording powers Pw, an erasing powers Pe and a bottom power Pb prestored in the memory 451 of the system controller 45. These three values are optimum values for offering the optical storage medium A excellent recording characteristics. Identification data that indicates these three values may be prestored in the memory 451, updated or stored with the help of the reflectivity detector 46. The memory 451 is either a ROM (Read Only Memory) or a recordable RAM (Random Access Memory), for example.

The optical recording apparatus in this embodiment can set any recording linear velocity selected among a plurality of recording linear velocities for higher linear velocity (×speed) in optical storage media. On receiving an instruction signal for selecting a recording linear velocity (×speed mode), the system controller 45 controls the Pw-drive current source 431$w$, the Pe-drive current source 431$e$, and the Pb-drive current source 431$b$, as disclosed above, based on the identification data on an instructed recording linear velocity and prestored in the memory 451. Identification data at a plurality of recording linear velocities are prestored in the memory 451, as disclosed above.

A generated recording pulse pattern is input to the optical head 34. The optical head 34 controls the LD 33 to output LD-emission waveforms with a desired recording pulse pattern and power ratio $\epsilon$ (Pw/Pe), thus recording information to be recorded on the optical storage medium A.

The recording-pulse generator unit 39, the LD driver unit 43, and the optical head 34 work together as a recording unit 400 that generates a recording pulse pattern of recording pulses rising from an erasing power Pe and formed between a recording power Pw larger than the erasing power Pe and a bottom power Pb smaller than the erasing power Pe and of erasing pulses rising from the bottom power Pb to the erasing power Pe, based on the mark-length data generated by the mark-length counter 41, and irradiates a recording beam onto the recording layer 3 of the optical storage medium A through the LD 33 in accordance with the recording pulse pattern, thus recording recorded marks indicating the information to be recorded.

[Study of Optimum Reflectivity Ratio]

The inventors of the present invention presupposed that recording and overwrite characteristics of the optical storage medium A could be affected by a relationship (reflectivity ratio) between reflectivity on un-recorded sections and that on the same sections irradiated with a recording beam in accordance with a recording pulse pattern, on the recording layers 3 and 13 of the optical storage medium A, and found out that the presumption is correct and there is the optimum reflectivity ratio that gives excellent recording and overwrite characteristics, based on the following embodiment samples A-1 to A-6 and comparative samples A-7 to A-13.

Figure 7:
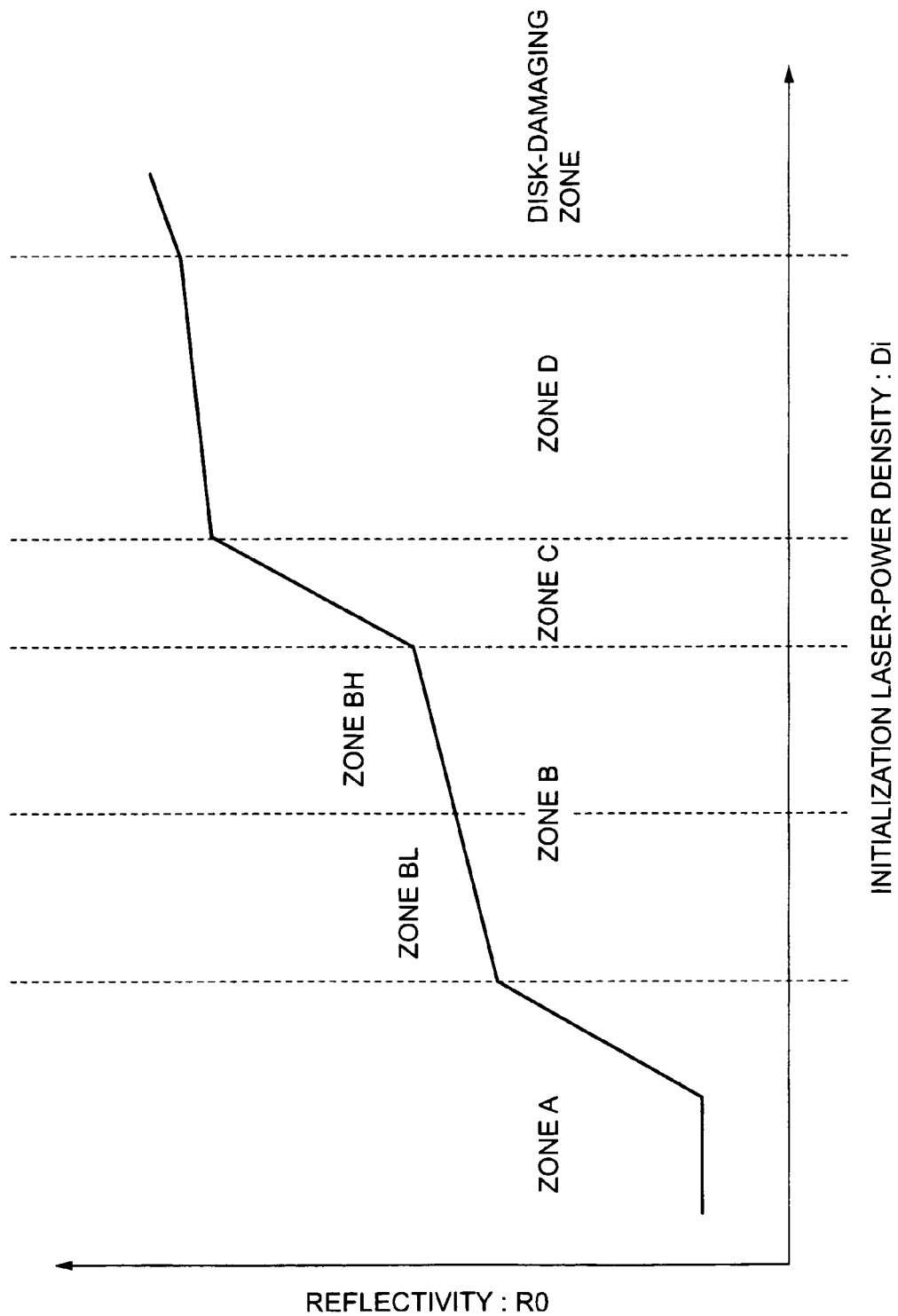
FIG. 7 is a view indicating a relationship between initialization laser-power density Di and reflectivity R0 of an optical storage medium A after initialized.

Discussed first is a relationship between initialization laser-power density Di and reflectivity R0 of the optical storage medium A. Shown in FIG. 7 is a relationship between reflectivity R0 and initialization laser-power density Di. The initialization laser-power density Di is obtained by dividing a laser power of an initialization laser beam by an area irradiated with the initialization laser beam, and dividing a resultant quotient by a scanning speed of the initialization laser beam. The reflectivity R0 is, as described later, a reflectivity exhibited by an un-recorded section of the recording area 54 of the optical storage medium A, on which no data has ever been recorded, when irradiated with a reproducing beam (0.7 mW) having a laser power Pr from the LD 33. It is an average reflectivity on one circular track in this embodiment.

A low initialization laser-power density Di in a zone A causes an amorphous section (As-depo) to remain after sputtering, which results in poor DOW-0 jitter characteristics, thus not acceptable.

A higher initialization laser-power density Di shifts the zone from A to B in which no amorphous section (As-depo) remains, which causes a comparatively small reflectivity change. In the zone B in which the reflectivity R0 gradually increases as the initialization laser-power density Di increases, the former-half low reflectivity side zone is referred to as BL and the latter-half high reflectivity side zone is referred to as BH. A further higher initialization laser-power density Di shifts the zone to C with a bigger reflectivity change, D with a smaller reflectivity change, and a disk-damaging zone. In the disk-damaging zone, an extremely large laser power at initialization causes thermal physical damages to the recording layers 3 and 13 and the surrounding layers.

In the layers L0 and L1, the recording layers 3 and 13 and the reflective layers 5 and 15 have different thicknesses, so that the initialization laser-power density Di may be different on the border between adjacent zones. Nevertheless, the relationship shown in FIG. 7 is applied to both of the layers L0 and L1. Moreover, a first reflectivity ratio (R1/R0) and a second reflectivity ratio (R9/R0) which will be obtained later are equal in the same zone for the layers L0 and L1 because both reflectivity ratios depend on the reflectivity ratio R0.

The embodiment samples A-1 to A-6 and the comparative samples A-7 to A-13 were subjected to recording (1-beam overwriting) and reproduction with an optical-disk drive tester (DDU1000) equipped with a 658 nm-wavelength laser diode and an optical lens (NA=0.60) made by Pulstec. Co. Focusing was made on each of the recording layers 3 and 13 for evaluation respectively.

Recording and reproduction were evaluated with an 8-16 (EFM+) modulation random pattern at 7 m/s in recording linear velocity (corresponding to DVD standard 2×speed). The unit clock T was 19.2 ns (corresponding to DVD 2×speed). The bit length was 0.267 μm/bit. Recording was conducted in the same density as DVD-ROM, the capacity corresponding to 4.7 gigabytes. Recording of 10-time overwriting were conducted to a target track and adjacent tracks according to the optimum requirements for the optical storage media, followed by slicing at the amplitude center of each reproduced signal for measurements of clock to data jitters. The laser power (reproducing power) Pr of each reproducing beam was 0.7 mW for the recording layer 3 of the layer L0 and 1.2 mW for the recording layer 13 of the layer L1.

A multiple pulse sequence defined in the DVD-RW version 1.1, such as shown in FIG. 4, was used as the recording strategy.

Embodiment Sample A-1

Production of the layer L0 is disclosed first in detail. For the layer L0, several layers which will be disclosed later, were formed on a substrate 1 made of a polycarbonate resin with 120 mm in diameter and 0.6 mm in thickness. Grooves were formed on the substrate 1 at 0.74 μm in track pitch, with 25 nm in groove depth and about 40:60 in width ratio of groove to land. The grooves stuck out when viewed from an incident direction of a laser beam in recording, reproduction or erasure.

After a vacuum chamber was exhausted up to $3\times10^{-4}$ Pa, a 70 nm-thick first dielectric film 2 was formed on the substrate 1 by high-frequency magnetron sputtering with a target of ZnS added with 20-mol % $SiO_2$ at $2\times10^{-1}$ Pa in Ar-gas atmosphere.

Formed on the first dielectric film layer 2, in order, were a 6 nm-thick recording layer 3 with a target of an alloy of 4 elements Ge—In—Sb—Te, a 10 nm-thick second dielectric film 4 of the same material as the first dielectric film 2, and a 10 nm-thick reflective layer 5 with a target of Ag—Pd—Cu.

The substrate 1 was taken out from the vacuum chamber. The reflective layer 5 was spin-coated with an acrylic ultraviolet-cured resin (SK5110 made by Sony Chemicals. Co.). The resin was cured with radiation of ultraviolet rays so that a 3 μm-thick protective layer 6 was formed on the reflective layer 5.

The layer L1 was produced next, with the same method as the layer L0 for the corresponding layers and films. Formed on the substrate 11, in order, were a 120 nm-thick reflective layer 15 with a target of Ag—Pd—Cu, a 16 nm-thick third dielectric film 12 of the same material as the first dielectric film 2, a 16 nm-thick recording layer 13 with a target of an alloy of 4 elements Ge—In—Sb—Te, and a 70 nm-thick fourth dielectric film 14 of $ZnS.SiO_2$. The recording layer 13 contains the same Sb/Te as that for the recording layer 3.

The recording layers 3 and 13 of the un-initialized optical storage medium were initialized by the initialization apparatus 200 (POP120 made by Hitachi Computer Peripherals, Co.) with a laser beam having 94 μm in beam width in radial direction and 1.0 μm in beam width in scanning direction, at 2 m/s in scanning linear velocity, 720 mW in laser power and 15 μm in scanning pitch (initialization laser-power density Di=3.83 [mW·s/(μm²·m)], zone=BH in FIG. 7).

After initialization of the layers L0 and L1, the protective layer 6 and the fourth dielectric film 4 were faced and bonded to each other with the transparent layer 20, thus the optical storage medium A shown in FIG. 2 was produced. A double-sided adhesive sheet was used for the transparent layer 20. The layers L0 and L1 were bonded to each other after initialized in this embodiment. Initialization may, however, be performed after the layers L0 and L1 are bonded to each other.

Obtained next were reflectivities R0 and R1. The reflectivity R0 is a reflectivity exhibited by an un-recorded section of the recording area 54 of the optical storage medium A, on which no data has ever been recorded, when irradiated with a reproducing beam (0.7 mW) having a laser power Pr from the LD 33. The reflectivity R1 is a reflectivity exhibited by the un-recorded section when irradiated with a reproducing laser beam from the LD 33 after irradiated once for one track with a laser beam with a recording pulse pattern. The recording pulse pattern used in this embodiment was a recording pulse pattern (random pattern) that can form recorded marks in the range from 3T to 14T. The three levels of the laser beam were optimum levels for lowest jitters. The reflectivity R1 is a reflectivity (an average for one track) when one track is irradiated with a laser beam based on the random pattern. Obtained as R9 is a reflectivity exhibited by an un-recorded section when irradiated with a reproducing laser beam from the LD 33 after irradiated with a laser beam in accordance with the random pattern nine times for one track.

Recording was then conducted to grooves of the recording layers 3 and 13 of the optical storage medium A.

The recording requirements for the recording pulse pattern were Ttop=0.6 [T], Tmp=0.5 [T], and Tcl=0.0 [T] at a linear velocity of 7 m/s (DVD×2 speed), with three levels in strength of laser beams: a recording power Pw=17.0 [mW], an erasing power Pe=4.6 [mW] and, a bottom power Pb=0.5 [mW] (power ratio $\epsilon$=Pe/Pw=0.27).

The embodiment sample A-1 of the optical storage medium A exhibited 5.9% in reflectivity R0 on the un-recorded section of the recording layer 3, 6.2% in reflectivity R1 after irradiated once with a recording beam in accordance with the recording pulse pattern, and 6.5% in reflectivity R9 after irradiated nine times with the recording beam in accordance with the recording pulse pattern. The first reflectivity ratio (R1/R0) was 1.051 while the second reflectivity ratio (R9/R0) was 1.102. The same were obtained for the layer L1: R0=6.1%, R1=6.3%, R9=6.6% (R1/R0=1.033, R9/R0=1.082). All measured values for the embodiment sample A-1 are shown in FIG. 12 for the layer L0 and FIG. 13 for the layer L1.

The relationship between the initialization laser-power density Di and the reflectivity zones may be different for the layers L0 and L1 because these layers have different layer thicknesses. Thus, the initialization laser-power density Di was varied for un-recorded sections to obtain the relationship between the density Di and the reflectivity zones for each of the layers L0 and L1 so that reflectivity zones could be determined for the layers L0 and L1 based on the density Di.

Initial characteristics and overwrite recording characteristics of the layer L0 were as shown in FIG. 12: 7.3% in initial-recording (DOW 0) jitter, 8.8% in 1-time overwrite (DOW 1) jitter, and 8.3% in 9-time overwrite (DOW 9) jitter. Moreover, although not shown, jitter in about 10,000-time overwrite (DOW 10000) was 9.5%. Thus, the layer L0 was always stable in its characteristics after overwriting, with excellent recording characteristics. Moreover, as shown in FIG. 13, the layer L1 exhibits: 7.1% in DOW-0 jitter, 8.6% in DOW-1 jitter, 8.2% in DOW-9 jitter, and 9.2% in DOW-10000 jitter, excellent in recording characteristics, like the layer L0.

Overwriting is 1-beam overwriting for erasing a recorded mark already formed and forming a new recorded mark with one-time laser scanning, in the disclosure. Also defined in the disclosure are: DOW 0 (Direct Over Write, referred to as overwriting in the disclosure); initial recording for forming a recorded mark on an un-recorded section of an initialized optical storage medium A; and DOW 1; 1-th overwriting for forming another recorded mark on the initially recorded section. Jitter of 10% or less has been accepted as giving less adverse effects to error rate. Thus, defined further in the disclosure is: "excellent" in jitter of 10% or less for DOW-0 jitter, 11% or less for DOW-1 jitter, and 9% or less for DOW-9 jitter.

Embodiment Sample A-2

The optical storage medium A in the embodiment sample A-2 was prepared for which the recording layers were initialized under the same initialization requirements as that for the embodiment sample A-1 except change in laser power to 740 [mW] (initialization laser-power density Di=3.94 [mW·s/ ($\mu m^2 \cdot m$)], zone=BH). Measurements were conducted in the same was as the embodiment sample A-1 except change in power ratio $\epsilon$ to 0.23. Results for the layer L0 were: R0=6.1%, R1=6.4%, and R9=6.7% (R1/R0=1.049, R9/R0=1.098), excellent in DOW-jitter characteristics, like the embodiment sample A-1, as shown in FIG. 12. Results for the layer L1 were: R0=6.2%, R1=6.5%, and R9=6.8% (R1/R0=1.048, R9/R0=1.097), excellent in DOW-jitter characteristics, like the embodiment sample A-1, as shown in FIG. 13.

Embodiment Sample A-3

The optical storage medium A in the embodiment sample A-3 was prepared for which the recording layers were initialized under the same initialization requirements as that for the embodiment sample A-1 except change in laser power to 700 [mW] (initialization laser-power density Di=3.72 [mW·s/ ($\mu m^2 \cdot m$)], zone=BH). Measurements were conducted in the same was as the embodiment sample A-1 except change in power ratio $\epsilon$ to 0.38. Results for the layer L0 were: R0=5.7%, R1=6.3%, and R9=6.6% (R1/R0=1.105, R9/R0=1.158), excellent in DOW-jitter characteristics, like the embodiment sample A-1, as shown in FIG. 12. Results for the layer L1 were: R0=5.8%, R1=6.5%, and R9=6.7% (R1/R0=1.121, R9/R0=1.155), excellent in DOW-jitter characteristics, like the embodiment sample A-1, as shown in FIG. 13.

Embodiment Sample A-4

The optical storage medium A in the embodiment sample A-4 was prepared for which the recording layers were initialized under the same initialization requirements as that for the embodiment sample A-1 except change in laser power to 780 [mW] (initialization laser-power density Di=4.15 [mW·s/ ($\mu m^2 \cdot m$)], zone=BH). Measurements were conducted in the same was as the embodiment sample A-1 except change in power ratio $\epsilon$ to 0.21. Results for the layer L0 were: R0=6.3%, R1=6.33%, and R9=6.6% (R1/R0=1.005, R9/R0=1.048), excellent in DOW-jitter characteristics, like the embodiment sample A-1, as shown in FIG. 12. Results for the layer L1 were: R0=6.4%, R1=6.45%, and R9=6.8% (R1/R0=1.008, R9/R0=1.055), excellent in DOW-jitter characteristics, like the embodiment sample A-1, as shown in FIG. 13.

Embodiment Sample A-5

The optical storage medium A in the embodiment sample A-5 was prepared for which the recording layers were initialized under the same initialization requirements as that for the embodiment sample A-1 except change in laser power to 610 [mW] (initialization laser-power density Di=3.24 [mW·s/ ($\mu m^2 \cdot m$)], zone=BH). The reflectivity zone was BH but closer to BL. Measurements were conducted in the same was as the embodiment sample A-1 except change in power ratio $\epsilon$ to 0.38. Results for the layer L0 were: R0=5.4%, R1=6.2%, and R9=6.4% (R1/R0=1.141, R9/R0=1.185), excellent in DOW-jitter characteristics, like the embodiment sample A-1, as shown in FIG. 12. Results for the layer L1 were: R0=5.5%, R1=6.3%, and R9=6.5% (R1/R0=1.145, R9/R0=1.182), excellent in DOW-jitter characteristics, like the embodiment sample A-1, as shown in FIG. 13.

Embodiment Sample A-6

The optical storage medium A in the embodiment sample A-6 was prepared for which the recording layers were initialized under the same initialization requirements as that for the embodiment sample A-1 except change in laser power to 695 [mW] (initialization laser-power density Di=3.70 [mW·s/ ($\mu m^2 \cdot m$)], zone=BH). Measurements were conducted in the same was as the embodiment sample A-1. Results for the layer L0 were: R0=5.7%, R1=6.4%, and R9=6.8% (R1/R0=1.123, R9/R0=1.193), excellent in DOW-jitter characteristics, like the embodiment sample A-1, as shown in FIG. 12.

Results for the layer L1 were: R0=5.8%, R1=6.4%, and R9=6.9% (R1/R0=1.103, R9/R0=1.190), excellent in DOW-jitter characteristics, like the embodiment sample A-1, as shown in FIG. 13.

Comparative Sample A-7

The optical storage medium A in the comparative sample A-7 was prepared for which the recording layers were initialized under the same initialization requirements as that for the embodiment sample A-1 except change in laser power to 580 mW (initialization laser-power density Di=3.09 [mW·s/($\mu m^2$·m)], zone=BL). Measurements were conducted in the same was as the embodiment sample A-1. Results for the layer L0 were: R0=5.3%, R1=6.1%, and R9=6.3% (R1/R0=1.151, R9/R0=1.189). As shown in FIG. 12, the comparative sample A-7 exhibited DOW-1 jitter of 11.9%, beyond 11%, and DOW-9 jitter of 10.6%, beyond 9%, thus suffered from poor DOW-jitter characteristics. Results for the layer L1 were: R0=5.4%, R1=6.3%, and R9=6.4% (R1/R0=1.167, R9/R0=1.185). As shown in FIG. 13, the comparative sample A-7 exhibited high DOW-1 and DOW-1 jitter levels, like the layer L0, thus suffered from poor DOW-jitter characteristics.

Comparative Sample A-8

The optical storage medium A in the comparative sample A-8 was prepared for which the recording layers were initialized under the same initialization requirements as that for the embodiment sample A-1 except change in scanning linear velocity to 1.7 m/s (initialization laser-power density Di=4.51 [mW·s/($\mu m^2$·m)], zone=C). Measurements were conducted in the same was as the embodiment sample A-1. Results for the layer L0 were: R0=6.4%, R1=6.5%, and R9=6.6% (R1/R0=1.016, R9/R0=1.031). As shown in FIG. 12, the comparative sample A-8 exhibited DOW-0 jitter of 11.8%, poor, particularly, in the initial recording characteristics, thus suffered from poor DOW-jitter characteristics. Results for the layer L1 were: R0=6.5%, R1=6.6%, and R9=6.7% (R1/R0=1.015, R9/R0=1.031). As shown in FIG. 13, the comparative sample A-8 exhibited DOW-0 jitter of 11.5%, poor, in the initial recording characteristics, like the layer L0.

Comparative Sample A-9

The optical storage medium A in the comparative sample A-9 was prepared for which the recording layers were initialized under the same initialization requirements as that for the embodiment sample A-1 except change in scanning linear velocity to 1.7 m/s and initialization laser power to 760 mW (initialization laser-power density Di=4.76 [mW·s/($\mu m^2$·m)], zone=D). Measurements were conducted in the same was as the embodiment sample A-1. Results for the layer L0 were: R0=6.7%, R1=6.7%, and R9=6.8% (R1/R0=1.000, R9/R0=1.015). As shown in FIG. 12, the comparative sample A-9 exhibited DOW-1 jitter of 14.9%, thus suffered from poor DOW-jitter characteristics. Results for the layer L1 were: R0=6.8%, R1=6.8%, and R9=6.9% (R1/R0=1.000, R9/R0=1.015). As shown in FIG. 13, the comparative sample A-9 exhibited DOW-1 jitter of 14.7%, thus suffered from poor DOW-jitter characteristics, like the layer L0.

Comparative Sample A-10

The optical storage medium A in the comparative sample A-10 was prepared for which the recording layers were initialized under the same initialization requirements as that for the embodiment sample A-1 except change in scanning linear velocity to 1.8 m/s (initialization laser-power density Di=4.26 [mW·s/($\mu m^2$·m)], zone=C). Measurements were conducted in the same was as the embodiment sample A-1. Results for the layer L0 were: R0=6.4%, R1=6.5%, and R9=6.7% (R1/R0=1.016, R9/R0=1.042). As shown in FIG. 12, the comparative sample A-10 exhibited DOW-9 jitter of 10%, thus suffered from poor jitter characteristics. Results for the layer L1 were: R0=6.5%, R1=6.6%, and R9=6.8% (R1/R0=1.014, R9/R0=1.045). As shown in FIG. 13, the comparative sample A-10 exhibited DOW-9 jitter of 10%, thus suffered from poor jitter characteristics, like the layer L0.

Comparative Sample A-11

The optical storage medium A in the comparative sample A-11 was prepared for which the recording layers were initialized under the same initialization requirements as that for the embodiment sample A-1 except change in scanning linear velocity to 2.1 m/s and initialization laser power to 580 mW (initialization laser-power density Di=2.94 [mW·s/($\mu m^2$·m)], zone=BL). Measurements were conducted in the same was as the embodiment sample A-1. Results for the layer L0 were: R0=5.3%, R1=6.1%, and R9=6.4% (R1/R0=1.151, R9/R0=1.208). As shown in FIG. 12, the comparative sample A-11 exhibited DOW-1 jitter of 12.1% and DOW-9 jitter of 10.8%, thus suffered from poor jitter characteristics. Results for the layer L1 were: R0=5.4%, R1=6.1%, and R9=6.5% (R1/R0=1.140, R9/R0=1.215). As shown in FIG. 13, the comparative sample A-11 exhibited DOW-1 jitter of 12.1%, thus suffered from poor jitter characteristics.

It is found from the embodiment samples A-1 to A-6 and the comparative samples A-7 to A-11 that it is possible to restrict DOW-1 jitter below 11.0% and DOW-9 jitter to 9.0% or less at the first reflectivity ratio (R1/R0) in the range from 1.00 to 1.15. It is also found that, in this range, the second reflectivity ratio (R9/R0) lies in the range from 1.05 to 1.20.

It is further found that jitters are generated at unacceptable levels when (R1/R0) and/or (R9/R0) lie out of the range indicated above.

Comparative Sample A-12

The optical storage medium A in the comparative sample A-12 was produced in the same way as the embodiment sample A-1, and recorded under the same recording requirements as that for the embodiment sample A-1 except change in power ratio $\epsilon$ to 0.18, and measurements were conducted. Results for the layer L0 were: R0=6.1%, R1=6.2%, and R9=6.3% (R1/R0=1.016, R9/R0=1.033). As shown in FIG. 12, the comparative sample A-12 exhibited DOW-1 jitter of 19.8% and DOW-9 jitter of 13.1%, thus suffered from poor jitter characteristics. Results for the layer L1 were: R0=6.1%, R1=6.1%, and R9=6.3% (R1/R0=1.000, R9/R0=1.033). As shown in FIG. 13, the comparative sample A-12 exhibited DOW-1 jitter of 19.5% and DOW-9 jitter of 12.9%, thus suffered from poor jitter characteristics, like the layer L0.

Comparative Sample A-13

The optical storage medium A in the comparative sample A-13 was produced in the same way as the embodiment sample A-1, and recorded under the same recording requirements as that for the embodiment sample A-1 except change in power ratio $\epsilon$ to 0.50, and measurements were conducted. Results for the layer L0 were: R0=6.0%, R1=6.2%, and R9=6.5% (R1/R0=1.033, R9/R0=1.083). As shown in FIG.

12, the comparative sample A-13 exhibited DOW-1 jitter of 13.6%, thus suffered from poor jitter characteristics. Results for the layer L1 were: R0=5.9%, R1=6.8%, and R9=6.8% (R1/R0=1.153, R9/R0=1.153). As shown in FIG. 13, the comparative sample A-13 exhibited DOW-1 jitter of 13.5%, thus suffered from poor jitter. characteristics, like the layer L0.

According to the evaluation, it is found that the refelectivities R0, R1 and R9, and the first reflectivity ratio (R1/R0) based these refelectivities defined as above for the optical storage medium A offer acceptable results when they satisfy the relationship indicated by an expression (1) shown below. It is also found that the second reflectivity ratio (R9/R0) offers acceptable results when it satisfies the relationship indicated by an expression (2) shown below. The initialization laser power Di may be adjusted so that the expressions (1) and (2) are satisfied. The optical storage medium A exhibits excellent recording and overwrite characteristics in one-time or more of overwriting when the expressions (1) and (2) are satisfied.

$$1.00 < (R1/R0) < 1.15 \quad (1)$$

$$1.05 < (R9/R0) < 1.20 \quad (2)$$

The first reflectivity ratio (R1/R0) over 1.15 allows many amorphous portions to exist in initialized un-recorded sections, thus causing a problem of insufficient modulation amplitude for reproduced signals, for example. It could further cause insufficient reflectivity for dual-layer optical storage media so that the media cannot be recognized at a drive.

A lower reflectivity R0 could cause higher reflectivity due to repeated overwriting. Specific initialization requirements for the second reflectivity ratio (R9/R0) to satisfy the expression (2) allow smaller variation in crystalline phase even if overwriting is repeated, thus providing acceptable DOW-9 jitter in DVD-RW standard.

Figure 8:
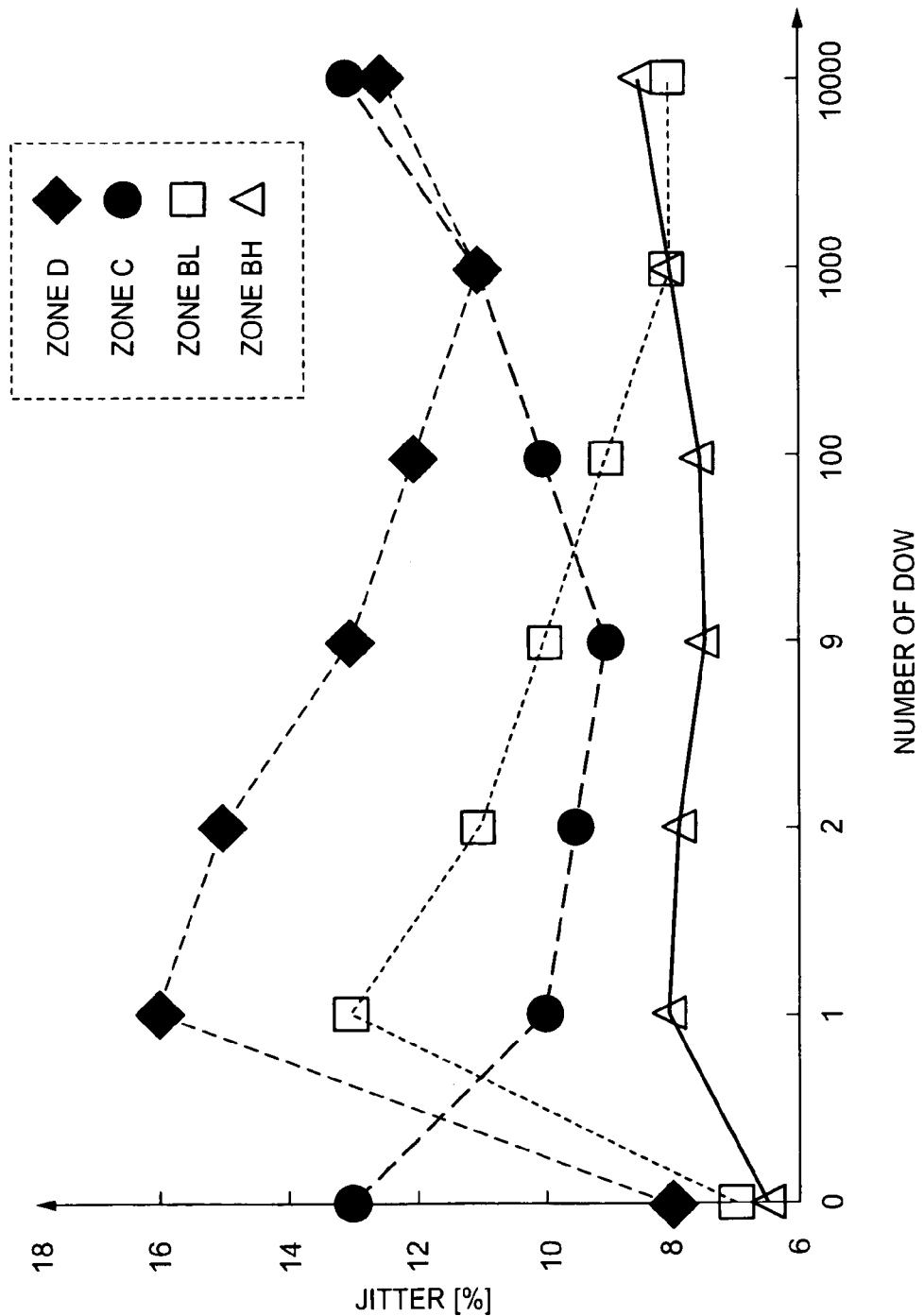
FIG. 8 is a view showing DOW-jitter characteristics indicating a relationship between the number of DOW and jitter over reflectivity zones B to D shown in FIG. 7.

FIG. 8 shows DOW-jitter characteristics indicating a relationship between the number of overwriting (DOW) and jitter over reflectivity zones B to D.

Initialization requirements based on an initialization laser-power density Di, or an initialization laser power and scanning linear velocity, in the zone D, give acceptable jitter in DOW 0 whereas excessive jitter in DOW 1, thus unacceptable. The second reflectivity ratio (R9/R0) in the zone D is smaller than 1.05, thus not satisfying the expression (2).

The initialization requirements in the zone C causes the zone to be shifted to in a range from BH and D, resulting in unstable initial characteristics, with excessive jitter especially in DOW 0, as shown in FIG. 8. A few times of repeated overwriting give acceptable jitter, nevertheless, DOW 9 (9-th overwriting) causes excessive jitter, thus unacceptable. R9/R0 in the zone C is smaller than 1.05, like the zone D, thus not satisfying the expression (2).

The DOW-jitter characteristics in the zone BL exhibit acceptable jitter in DOW 0 while hardly acceptable in DOW 1, thus not preferable. The first reflectivity ratio (R1/R0) in the zone BL is larger than 1.15, thus not satisfying the expression (1).

In contrast, the zone BH offers excellent DOW-jitter characteristics such as shown in FIG. 8, thus the optimum initialization requirement. In addition, the zone BH satisfies the expressions (1) and (2).

Figure 9:
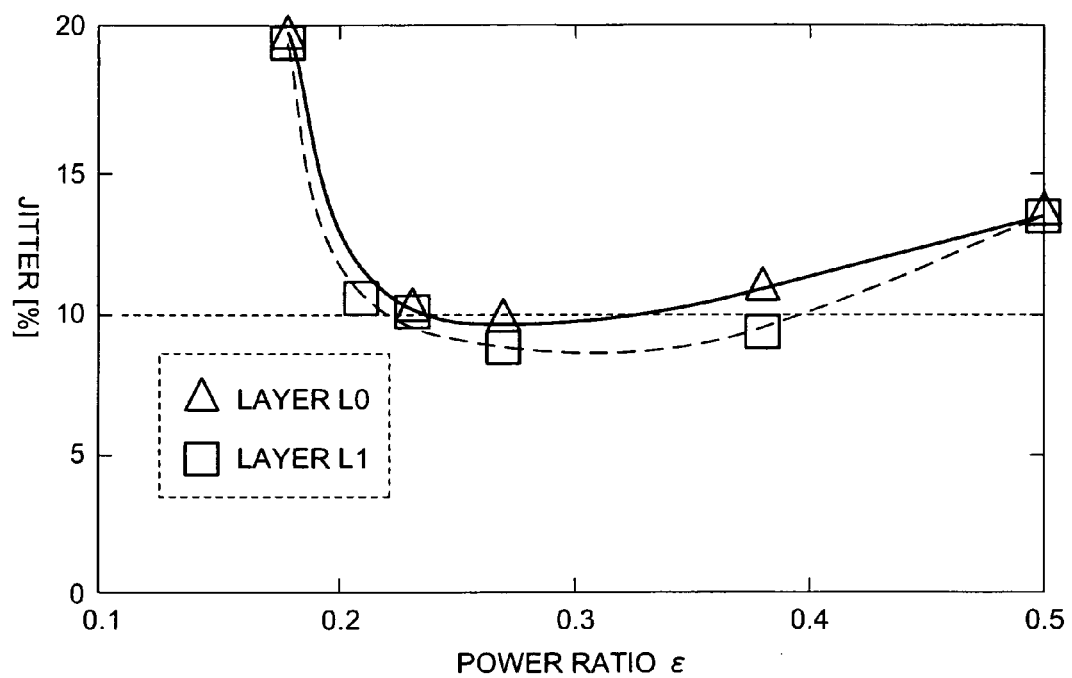
FIG. 9 is a view indicating relationships between jitter and power ratio E in layers L0 and L1.

FIG. 9 shows a relationship between jitter and power ratio $\epsilon$ in the layer L0 of the optical storage media A in the embodiment samples A-1 to A-6 and the comparatives samples A-7 to A-13. FIG. 9 teaches that the power ratio $\epsilon$ in the range from 0.20 to 0.40 provides acceptable DOW-1 jitter. Also shown in FIG. 9 is the similar relationship for the layer L1. It is also taught that the power ratio $\epsilon$ in the range from 0.20 to 0.40 provides acceptable DOW-1 jitter in the layer L1.

Figure 10:
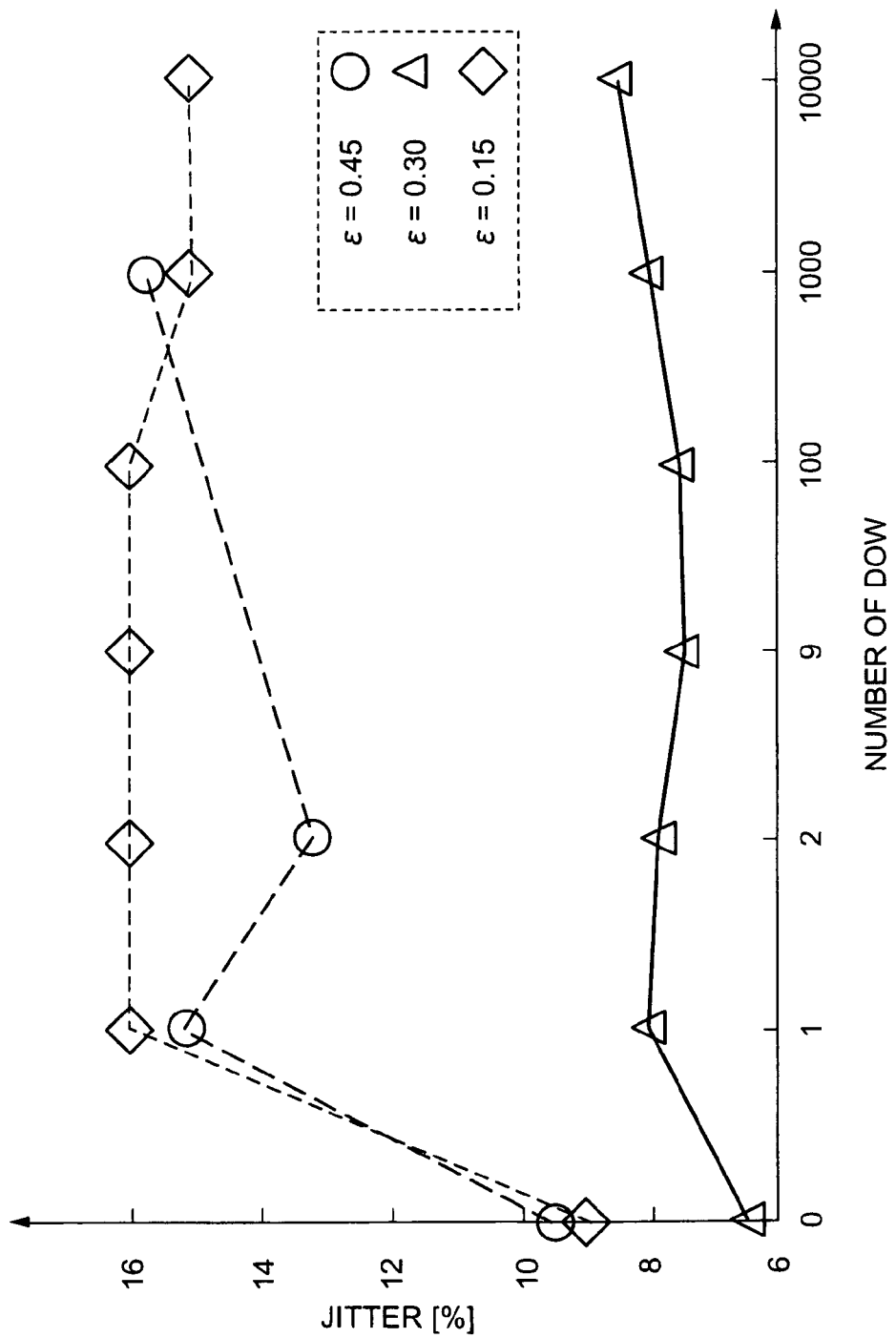
FIG. 10 is a view showing DOW-jitter characteristics indicating relationships of jitter to the number of DOW.

FIG. 10 shows DOW-jitter characteristics indicating relationships of jitter to the number of DOW. FIG. 10 indicates power ratios $\epsilon$ of 0.3, 0.15 smaller than 0.2, and 0.45 larger than 0.4. A power ratio $\epsilon$ smaller than 0.2 gives excessively small erasing power Pe to recording power Pw, thus resulting in insufficient erasing of already recorded marks. In FIG. 10, a power ratio $\epsilon$ of 0.15 provides poor jitter characteristics for DOW 1 and further, thus unacceptable. A power ratio $\epsilon$ over 0.40 gives excessively large erasing power Pe to recording power Pw, thus causing unstable crystalline phase. In FIG. 10, a power ratio $\epsilon$ of 0.45 provides poor DOW-1 jitter characteristics, thus unacceptable.

FIG. 10 teaches that a power ratio $\epsilon$ of 0.30 gives 10% or less in any number of DOW. Thus, acceptable power ratio $\epsilon$ for jitter of 10% or less lies in the range $0.20 \leq \epsilon \leq 0.40$.

A power ratio $\epsilon$ in $0.20 \leq \epsilon \leq 0.40$ does not allow the erasing power Pe to give energy beyond the melting point of the recording layer. In addition, a sufficiently long time is given to crystallization. Thus, high crystallization speed is given even though Sb/Te is low for the material of the recording layer. This provides the recording layers 3 and 13 with high-speed recordability and excellent recording characteristics without complex adjustments such as change in Sb/Te in the layer 3 of the layer L0 and the layer 13 of the layer L1.

Figure 11:
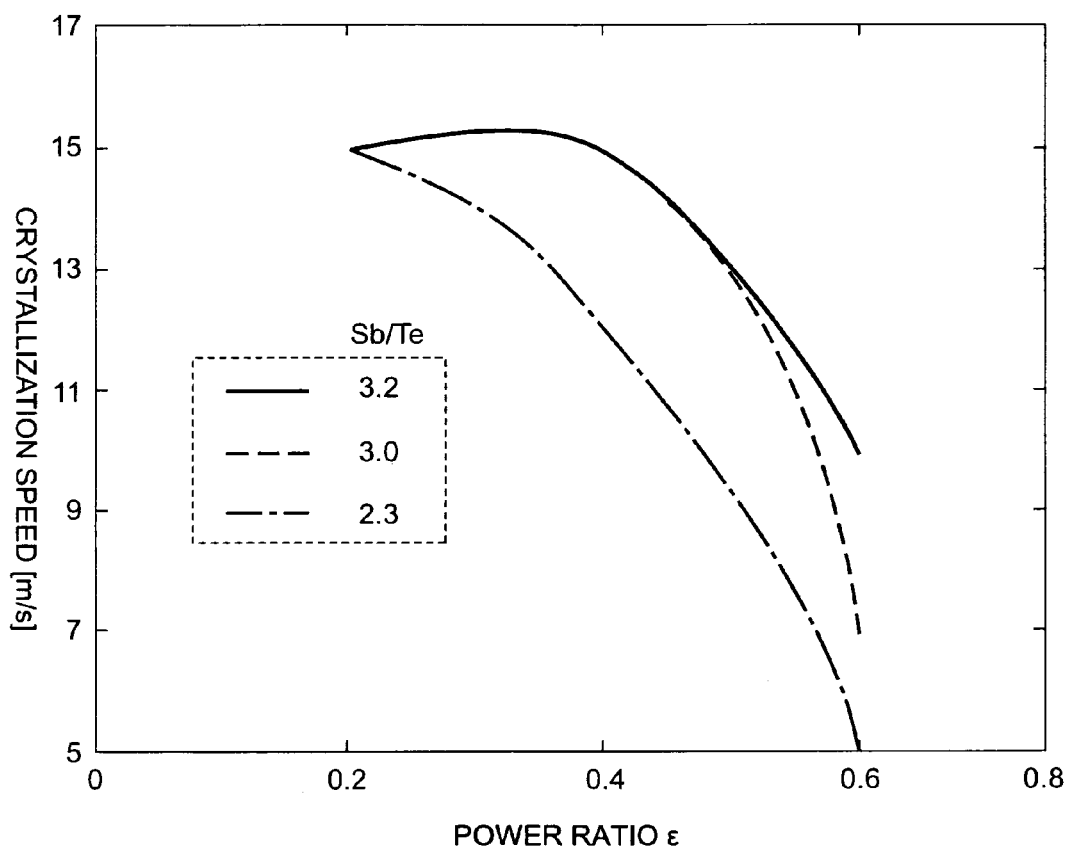
FIG. 11 is a view indicating relationships between recording linear velocity and power ratio ∈.

FIG. 11 shows relationships between crystallization speed and power ratio $\epsilon$ for the recording layers made of SbTe materials. The solid line indicates Sb/Te ratio of 3.2, a broken line 3.0, and a dashed line 2.3. It is taught that a power ratio $\epsilon$ in $0.20 \leq \epsilon \leq 0.40$ according to the present invention gives a crystallization speed corresponding to DVD 4×speed even if Sb/Te is low such as 3.0.

[Study of Transmissivity]

The inventors of the present invention presupposed that a thinner film thickness for higher transmissivity for the recording layer 3 of the layer L0 could affect recording and overwrite characteristics of the optical storage medium, and found out that the presumption is correct and there is a structure of the layer L0 that gives excellent recording and overwrite characteristics, based on the following embodiment samples B-1 to B-5 and comparative samples B-6 to B-12.

To improve transmissivity of the recording layer 3, in the following description, optical storage media A were produced and evaluated with the structure and initialization requirements for the layer L0 different from those for the embodiment sample A-1. The other requirements for the layer L0 were the same as those for the embodiment sample A-1.

As for the recording layer 13 of the layer L1 to be incorporated, used for the embodiment samples B-1 to B-5 and the comparative samples B-6 to B-12 were identical to those for the embodiment samples A-1 to A-5 and the comparative samples A-7 to A-13, respectively, thus description for the layer L1 is omitted. The recording layer 3 of the layer L0 will only be disclosed in detail and shown in FIG. 14 for all of the embodiment and the comparative samples.

Embodiment Sample B-1

Like the embodiment sample A-1, a 70 nm-thick first dielectric film 2 made of ZnS and $SiO_2$ was formed on the substrate 1 in the vacuum chamber, followed by lamination of a 5 nm-thick recording layer 3 with a target of an alloy of 4 elements Ge—In—Sb—Te, an 8 nm-thick second dielectric film 4 of the same material as the first dielectric film 2, and a 7 nm-thick reflective layer 5 with a target of Ag—Pd—Cu.

The substrate 1 was taken out from the vacuum chamber. The reflective layer 5 was spin-coated with an acrylic ultraviolet-cured resin (SK5110 made by Sony Chemicals. Co.). The resin was cured with radiation of ultraviolet rays so that a 3 μm-thick protective layer 6 was formed on the reflective layer 5, thus the layer L0 was produced.

The recording layer 3 of the un-initialized optical storage medium was initialized by the initialization apparatus 200 used for the embodiment sample A-1 with a laser beam having 94 μm in beam width in radial direction and 1.0 μm in beam width in scanning direction, at 3 m/s in scanning linear velocity, 620 mW in laser power and 15 μm in scanning pitch (initialization laser-power density Di=2.2 [mW·s/(μm²·m)], zone=BH).

The layer L1 used in this sample was identical to that of the embodiment sample A-1 and initialized under the same initialization requirements for the embodiment sample A-1. The layers L0 and L1 were then bonded to other with the double-sided adhesive sheet as the transparent layer 20, thus the optical storage medium A was produced.

The recording layer 3 of the layer L0 in this optical storage medium A is thin, so that it exhibits high transmissivity but cooled very slowly. The initialization requirements for the recording layer 3 are different from those for the recording layer 13 of the layer L1. The similar structure were used and evaluated for the following embodiment samples B-2 to B-5 and comparative samples B-6 to B-12.

Measurements in the same way as the embodiment sample A-1 show R0=6.9%, R1=7.3% and R9=7.6% (R1/R0=1.058, R9/R0=1.101) for the layer L0, as shown in FIG. 14.

Initial characteristics and overwrite recording characteristics were as shown in FIG. 14: 7.4% in DOW-0 jitter, 9.0% in DOW-1 jitter, and 8.3% in DOW-9 jitter. Moreover, although not shown in FIG. 14, DOW-10000 jitter was 9.6%, thus, firmly stable in overwrite characteristics, with excellent recording characteristics.

Embodiment Sample B-2

The optical storage medium A in the embodiment sample B-2 was prepared for which the recording layer 3 was initialized under the same initialization requirements as that for the embodiment sample B-1 except change in laser power to 640 [mW] (initialization laser-power density Di=2.27 [mW·s/(μm²·m)], zone=BH). Measurements were conducted in the same was as the embodiment sample B-1 except change in power ratio ε to 0.23. Results for the layer L0 were: R0=7.1%, R1=7.4%, and R9=7.8% (R1/R0=1.042, R9/R0=1.099), excellent in DOW-jitter characteristics, like the embodiment sample B-1, as shown in FIG. 14.

Embodiment Sample B-3

The optical storage medium A in the embodiment sample B-3 was prepared for which the recording layer 3 was initialized under the same initialization requirements as that for the embodiment sample B-1 except change in laser power to 600 [mW] (initialization laser-power density Di=2.13 [mW·s/(μm²·m)], zone=BH). Measurements were conducted in the same was as the embodiment sample B-1 except change in power ratio ε to 0.38. Results for the layer L0 were: R0=6.7%, R1=7.4%, and R9=7.7% (R1/R0=1.104, R9/R0=1.149), excellent in DOW-jitter characteristics, like the embodiment sample B-1, as shown in FIG. 14.

Embodiment Sample B-4

The optical storage medium A in the embodiment sample B-4 was prepared for which the recording layer 3 was initialized under the same initialization requirements as that for the embodiment sample B-1 except change in laser power to 680 [mW] (initialization laser-power density Di=2.41 [mW·s/(μm²·m)], zone=BH). Measurements were conducted in the same was as the embodiment sample B-1 except change in power ratio ε to 0.21. Results for the layer L0 were: R0=7.2%, R1=7.24%, and R9=7.6% (R1/R0=1.006, R9/R0=1.056), excellent in DOW-jitter characteristics, like the embodiment sample B-1, as shown in FIG. 14.

Embodiment Sample B-5

The optical storage medium A in the comparative sample B-6 was prepared for which the recording layer 3 was initialized under the same initialization requirements as that for the embodiment sample B-1 except change in laser power to 480 mW (initialization laser-power density Di=1.70 [mW·s/(μm²·m)], zone=BL). Measurements were conducted in the same was as the embodiment sample B-1. Results for the layer L0 were: R0=6.3%, R1=7.3%, and R9=7.5% R1/R0=1.159, R9/R0=1.19), thus suffered from a little poor DOW-jitter characteristics, as shown in FIG. 14.

Comparative Sample B-6

The optical storage medium A in the comparative sample B-6 was prepared for which the recording layer 3 was initialized under the same initialization requirements as that for the embodiment sample B-1 except change in laser power to 480 mW (initialization laser-power density Di=1.70 [mW·s/(μm²·m)], zone=BL). Measurements were conducted in the same was as the embodiment sample B-1. Results for the layer L0 were: R0=6.3%, R1=7.3%, and R9=7.5% (R1/R0=1.151, R9/R0=1.188), thus suffered from a little poor DOW-jitter characteristics, as shown if FIG. 14.

Comparative Sample B-7

The optical storage medium A in the comparative sample B-7 was prepared for which the recording layer 3 was initialized under the same initialization requirements as that for the embodiment sample B-1 except change in laser power to 620 mW and linear velocity to 2.5 m/s (initialization laser-power density Di=2.64 [mW·s/(μm²·m)], zone=C). Measurements were conducted in the same was as the embodiment sample B-1. Results for the layer L0 were: R0=7.4%, R1=7.5%, and R9=7.6% (R1/R0=1.014, R9/R0=1.027), thus suffered from a little poor DOW-0 and DOW-1 jitters, as shown in FIG. 14.

Comparative Sample B-8

The optical storage medium A in the comparative sample B-8 was prepared for which the recording layer 3 was initialized under the same initialization requirements as that for the embodiment sample B-1 except change in laser power to 660 mW and linear velocity to 2.5 m/s (initialization laser-power density Di=2.81 [mW·s/(μm²·m)], zone=D). Measurements were conducted in the same was as the embodiment sample B-1. Results for the layer L0 were: R0=7.7%, R1=7.7%, and R9=7.8% (R1/R0=1.000, R9/R0=1.013), thus suffered from poor DOW-1 jitter, as shown in FIG. 14.

Comparative Sample B-9

The optical storage medium A in the comparative sample B-9 was prepared for which the recording layer 3 was initialized under the same initialization requirements as that for the embodiment sample B-1 except change in laser power to 620 mW and linear velocity to 2.8 m/s (initialization laser-power density Di=2.36 [mW·s/($\mu$m$^2$·m)], zone=C). Measurements were conducted in the same was as the embodiment sample B-1. Results for the layer L0 were: R0=7.4%, R1=7.6%, and R9=7.7% (R1/R0=1.027, R9/R0=1.041), thus suffered from a little poor DOW-9 jitter, as shown in FIG. 14.

Comparative Sample B-10

The optical storage medium A in the comparative sample B-10 was prepared for which the recording layer 3 was initialized under the same initialization requirements as that for the embodiment sample B-1 except change in laser power to 480 mW and linear velocity to 3.1 m/s (initialization laser-power density Di=1.65 [mW·s/($\mu$m$^2$·m)], zone=BL). Measurements were conducted in the same was as the embodiment sample B-1. Results for the layer L0 were: R0=6.4%, R1=7.2%, and R9=7.8% (R1/R0=1.125, R9/R0=1.219), thus suffered from a little poor DOW-9 jitter, as shown in FIG. 14.

Comparative Sample B-11

The optical storage medium A in the comparative sample B-11 was produced in the same way as the embodiment sample B-1, and recorded under the same recording requirements as that for the embodiment sample B-1 except change in power ratio $\epsilon$ to 0.18, and measurements were conducted. The reflectivity zone was BH. Results for the layer L0 were: R0=7.1%, R1=7.2%, and R9=7.2% (R1/R0=1.014, R9/R0=1.028), with DOW-1 jitter over 20%, as shown in FIG. 14.

Comparative Sample B-12

The optical storage medium A in the comparative sample B-12 was produced in the same way as the embodiment sample B-1, and recorded under the same recording requirements as that for the embodiment sample B-1 except change in power ratio $\epsilon$ to 0.5, and measurements were conducted. The reflectivity zone was BH. Results for the layer L0 were: R0=7.0%, R1=7.2%, and R9=7.6% (R1/R0=1.029, R9/R0=1.086), with unacceptable DOW-1 jitter, as shown in FIG. 14.

According to the evaluation, it is found that the expressions (1) and (2) are satisfied even though the initialization laser power density Di required for initializing the recording layer 3 is low when the recording layer 3, the second dielectric film 4, the semi-transparent film 5, etc., are very thin in order to achieve high transmissivity for the recording layer 3 of the layer L0.

The embodiment samples A and B were evaluated with the dual-layer phase-change type optical storage media. The present invention is, however, can further be applied to single-layer or multilayer phase-change optical storage media.

As disclosed above in detail, the present invention is achieved to solve the problems discussed above and provides a phase-change optical storage medium that exhibits excellent recording characteristics even at higher recording speed (in higher linear-velocity recording at and over, for example, DVD 4×speed (linear-velocity: 7 m/s)) and maintains excellent overwrite recording characteristics in, especially, one-time or plural times of overwriting.

Moreover, the present invention provides a phase-change optical storage medium that exhibits excellent recording and overwrite characteristics without making slower the crystallization speed of some of multi recording layers.

According to the present invention, excellent recording characteristics are achieved at higher recording speed and excellent overwrite recording characteristics are maintained in one-time or plural times of overwriting. In addition, there is no need to change the crystallization speed of some of multi recording layers.

What is claimed is:

1. A phase-change optical storage medium comprising:
   a substrate; and
   a recording layer, to be recorded on which is at least one recorded mark representing information to be recorded by irradiating a recording light beam onto the recording layer in accordance with a recording pulse pattern of recording pulses rising from an erasing power and formed between a recording power larger than the erasing power and a bottom power smaller than the erasing power and of erasing pulses rising from the bottom power to the erasing power,
   wherein expressions (1) and (2):

$$1.00 < (R1/R0) < 1.15 \quad (1)$$

$$1.05 < (R9/R0) < 1.20 \quad (2)$$

are satisfied for the recording layer, in which R0 is a reflectivity exhibited by an un-recorded section of the recording layer, on which no data has ever been recorded, when irradiated with a reproducing light beam, R1 is a reflectivity exhibited by the un-recorded section when irradiated with the reproducing light beam, after irradiated once with the recording light beam in accordance with the recording pulse pattern, and R9 is a reflectivity exhibited by the un-recorded section when irradiated with the reproducing light beam, after irradiated nine times with the recording light beam in accordance with the recording pulse pattern.

2. The optical storage medium according to claim 1 having a plurality of the recording layers.

3. The optical storage medium according to claim 1, wherein information to achieve $0.20 \leq \epsilon \leq 0.40$ is written in a specific area, in which Pw is the recording power, Pe is the erasing power, and $\epsilon$ is a power ratio ($\epsilon$=Pe/Pw) of the erasing power Pe to the recording power Pw.

* * * * *

UNITED STATES PATENT AND TRADEMARK OFFICE
CERTIFICATE OF CORRECTION

PATENT NO. : 7,564,769 B2  Page 1 of 1
APPLICATION NO. : 11/044545
DATED : July 21, 2009
INVENTOR(S) : Ikuo Matsumoto et al.

It is certified that error appears in the above-identified patent and that said Letters Patent is hereby corrected as shown below:

Title page, under item (*) "This patent is subject to a terminal disclaimer." should be deleted.

Signed and Sealed this

Twenty-second Day of September, 2009

David J. Kappos
*Director of the United States Patent and Trademark Office*